United States Patent [19]
Kono et al.

[11] Patent Number: 5,626,536
[45] Date of Patent: May 6, 1997

[54] LOCK-UP CLUTCH SLIP CONTROL APPARATUS AND ENGINE FUEL-CUT CONTROL APPARATUS FOR MOTOR VEHICLE

[75] Inventors: Katsumi Kono, Toyota; Shinya Nakamura, Owariasahi, both of Japan

[73] Assignee: Toyota Jidosha Kabushiki Kaisha, Toyota, Japan

[21] Appl. No.: 503,214

[22] Filed: Jul. 17, 1995

[30] Foreign Application Priority Data

| Jul. 19, 1994 | [JP] | Japan | 6-188961 |
| Jul. 21, 1994 | [JP] | Japan | 6-169583 |
| Jul. 22, 1994 | [JP] | Japan | 6-191989 |

[51] Int. Cl.$^6$ ............... F16H 61/14; F02D 41/12
[52] U.S. Cl. ............................ 477/181; 192/3.3
[58] Field of Search ....................... 477/169, 176, 477/181; 192/3.3

[56] References Cited

U.S. PATENT DOCUMENTS

| 4,706,790 | 11/1987 | Lockhart et al. | 192/3.3 |
| 4,724,939 | 2/1988 | Lockhart et al. | 192/3.3 |
| 4,947,734 | 8/1990 | Fujita et al. | 192/3.3 |
| 4,953,677 | 9/1990 | Aoki et al. | 192/3.3 |
| 4,953,679 | 9/1990 | Okino | 192/3.3 |
| 4,957,194 | 9/1990 | Sawa et al. | 477/169 |
| 5,029,087 | 7/1991 | Cowan et al. | 192/3.3 |
| 5,085,301 | 2/1992 | Imamura et al. | 477/181 |
| 5,121,820 | 6/1992 | Brown et al. | 192/3.3 |
| 5,141,089 | 8/1992 | Nobumoto et al. | 477/181 |
| 5,490,815 | 2/1996 | Kato et al. | 477/181 |

FOREIGN PATENT DOCUMENTS

| 1-112072 | 4/1989 | Japan . |
| 1-141273 | 6/1989 | Japan . |
| 1-39503 | 8/1989 | Japan . |
| 1-220765 | 9/1989 | Japan . |
| 1-279157 | 11/1989 | Japan . |
| 2-118265 | 5/1990 | Japan . |
| 5-149423 | 6/1993 | Japan . |
| 5-141528 | 6/1993 | Japan . |

*Primary Examiner*—Dirk Wright
*Attorney, Agent, or Firm*—Oblon, Spivak, McClelland, Maier & Neustadt, P.C.

[57] ABSTRACT

A slip control apparatus for a lock-up clutch in a power transmitting device of a motor vehicle equipped with a fuel-cut device for cutting a fuel supply to an engine when the engine speed is higher than a predetermined value, the apparatus including (a) a slip control device for controlling the lock-up clutch such that the actual slip speed coincides with a target slip speed, (b) a detector for detecting deceleration following acceleration of the vehicle, and (c) a timing control device for commanding the slip control device to initiate a slip control operation upon detection of the vehicle deceleration, and inhibiting the fuel-cut device from initiating a fuel-cut operation for a predetermined delay time after the initiation of the slip control operation. For controlling the lock-up clutch, the slip control means produces a slip control output determined on the basis of a feedback control value and a feed-forward control value. The apparatus may include a device for zeroing or reducing the feedback control value after the fuel-cut operation is initiated.

32 Claims, 24 Drawing Sheets

FIG. 2

| SHIFT POSITION | | SOLENOID VALVES | | C1 | C2 | B1 | B2 | F1 | B3 | F2 | C0 | F0 | B0 |
|---|---|---|---|---|---|---|---|---|---|---|---|---|---|
| | | S1 | S2 | | | | | | | | | | |
| P | | ⊗ | ⊗ | | | | | | | | | | |
| R | | ⊗ | ⊗ | | ○ | | | | | | ○ | | |
| N | | ⊗ | ⊗ | | | | | | | | ○ | | |
| D | 1st | ○ | × | ○ | | | | | | ○ | ○ | ○ | |
| | 2nd | ○ | ○ | ○ | | | ○ | ○ | | | ○ | ○ | |
| | 3rd | × | ○ | ○ | ○ | | ○ | | | | ○ | ○ | |
| | O/D | × | × | ○ | ○ | | ○ | | | | | | ○ |
| S | 1st | ○ | × | ○ | | | | | | ○ | ○ | ○ | |
| | 2nd | ○ | ○ | ○ | | | ○ | ○ | | | ○ | ○ | |
| | 3rd | × | ○ | ○ | ○ | | ○ | | | | ○ | ○ | |
| | (O/D) | × | × | ○ | ○ | | ○ | | | | | | ○ |
| L | 1st | ○ | × | ○ | | | | | ○ | ○ | ○ | ○ | |
| | 2nd | ○ | ○ | ○ | | ○ | ○ | ○ | | | ○ | ○ | |

LOCK-UP CLUTCH SLIP CONTROL APPARATUS AND ENGINE FUEL-CUT CONTROL APPARATUS FOR MOTOR VEHICLE

BACKGROUND OF THE INVENTION

1. Field of the Invention

The present invention relates to an apparatus for controlling the amount of slip of a lock-up clutch provided in a power transmitting system of a motor vehicle, an an apparatus for cutting fuel suuply to an engine of the vehicle.

2. Discussion of the Related Art

In a motor vehicle having a fluid-filled power transmitting device equipped with a lock-up clutch such as a torque convertor or fluid coupling incorporating such a lock-up clutch, it is proposed to control the lock-up clutch in a slip control mode or partially engaging mode during acceleration of the vehicle such that an actual amount of slip (slip speed) of the lock-up clutch, namely, a difference between the speeds of a pump impeller and a turbine impeller eventually coincides with a predetermined target slip speed, for the purpose of improving the fuel economy of the vehicle while minimizing the power loss due to slipping of the lock-up clutch. Some motor vehicles are equipped with a fuel-cut device adapted to cut a fuel supply to the engine during deceleration or coasting of the vehicle while the engine speed is higher than a predetermined fuel-cut speed. On such motor vehicles, it is also proposed to control the lock-up clutch in the slip control mode during the vehicle deceleration, for raising the engine speed so as to increase a period of time during which the fuel supply to the engine is cut by the fuel-cut device.

The slip control of the lock-up clutch during the vehicle deceleration is effected as long as the vehicle deceleration is detected by an idling position switch which is adapted to be turned on when a throttle valve of the engine is placed in the idling position. Namely, the idling position switch placed in the on position indicates that the vehicle is in deceleration or in a coasting run. The slip control is terminated when an operation to cut the fuel supply to the engine by the fuel-cut device is completed. As a result of this slip control of the lock-up clutch, the engine speed is raised to a level which is lower than the speed of the turbine impeller by the target slip speed. Therefore, a time period during which the engine speed is held above the predetermined fuel-cut speed is elongated. That is, the fuel-cut period is increased by the slip control operation of the lock-up clutch during the vehicle deceleration, whereby the fuel economy is accordingly improved. An example of such a slip control apparatus is disclosed in JP-A-1-220765, JP-A-2-118265, JP-A-5-149423 and JP-A-5-141528.

In the slip control of the lock-up clutch during the vehicle deceleration or coasting, the amount of a torque transmitted through the lock-up clutch (hereinafter referred to as "lock-up clutch torque") is relatively small, and a small change in the friction force or engagement force of the lock-up clutch will cause a comparatively large amount of change of the slip speed of the lock-up clutch. Thus, the slip control of the lock-up clutch tends to be unstable particularly in an initial period of the slip control. Accordingly, the conventional slip control apparatus suffers from a relatively low degree of control stability due to a change in the output torque of the engine upon operation of the fuel-cut device to cut the fuel supply to the engine.

In the conventional slip control apparatus disclosed in JP-A-2-118265, for example, the amount of slip of the lock-up clutch is controlled when the vehicle deceleration is detected. The slip control operation is initiated only after the lock-up clutch is once brought to the fully released position, and then the fuel-cut device is activated to cut the fuel supply when a predetermined time has passed after the initiation of the slip control operation. Thus, when the vehicle deceleration is detected, the engine speed suddenly drops due to the full releasing of the lock-up clutch. This may lead to inadequate operation of the lock-up clutch in the slip control mode. In the conventional slip control apparatus disclosed in JP-A-1-220765, the slip control of the lock-up clutch is effected according to a control equation which includes a feedback control value and a feed-forward control value. The fuel-cut device may be held off for some reason or other, even after the slip control operation is initiated. For example, the fuel-cut device is held off while the temperature of engine coolant water is held low. In this case, when the coolant water temperature rises above a certain limit, the fuel-cut device is activated, with a result of a variation in the output torque of the engine. This variation in the engine torque due to the operation of the fuel-cut device may impair the slip control stability of the lock-up clutch.

The slip control of the lock-up clutch when effected together with the fuel-cut operation during vehicle deceleration with the engine in the idling state as disclosed in JP-A-5-149423 will result in an increase in the engine braking effect, with the negative torque transmitted from the drive wheels to the engine through the lock-up clutch. On the other hand, the vehicle driver releases the accelerator pedal when the driver desires to run the vehicle in the coasting mode or when the driver desires to bring the vehicle to a stop. If the slip control of the lock-up clutch and the fuel cut of the engine are simultaneously effected when the vehicle driver wishes to continue a coasting run of the vehicle, the driver may feel an engine braking effect while the driver has no intention to stop the vehicle. In this case, therefore, the simultaneous slip control of the lock-up clutch and fuel cut of the engine gives the driver a discomfort. The degree of deceleration of the vehicle as felt by the driver is relatively high if the fuel cut of the engine is initiated as soon as the accelerator pedal has been released to the engine idling position. In this respect, the fuel cut upon releasing of the accelerator pedal may deteriorate the driving comfort as felt by the vehicle driver.

As indicated above, the slip control output for controlling the lock-up clutch in the slip control mode during deceleration of the vehicle is determined according to a control equation which includes a feedback control value and a feed-forward control value. The feedback control value is used to control the lock-up clutch such that the actual slip speed of the clutch coincides with a predetermined target slip speed. The feed-forward control value is used to determine the target slip speed depending upon the input torque of the lock-up clutch or output torque of the engine. In the slip control apparatus disclosed in JP-A-5-141528, the control equation is formulated so that the amount of decrease of the engine speed coincides with a predetermined target value.

The slip control of the lock-up clutch is effected by controlling a difference between the hydraulic pressures in engaging and releasing oil chambers formed on the opposite sides of a piston of the lock-up clutch. This pressure difference of the two oil chambers is controlled on an assumption that the torque capacity of the lock-up clutch linearly changes with a change in the pressure difference. During deceleration of the vehicle, the engine speed is lower than the turbine impeller speed, and a negative torque is transmitted from the vehicle drive wheels to the engine through the lock-up clutch. In this negative torque condition, the operating conditions of the torque converter greatly differ from that in the normal positive torque condition. For instance, the pressure distribution within the torque converter and the amount of oil leakage between the pump and turbine impellers considerably differ in the negative and positive torque conditions. Further, since the transmission torque of the lock-up clutch is considerably smaller in the slip control mode of the lock-up clutch than in the fully engaging mode, a relatively small change in the pressure difference will cause a relatively large change in the slip speed of the lock-up clutch. Therefore, a slight change or deviation of the feed-forward control value tends to cause a temporary full engagement of the lock-up clutch (with the slip speed being zeroed). This temporary full engagement of the clutch caused by the feed-forward control is generally changed into the slip control state, in a certain length of time as a result of the feedback control of the slip speed of the clutch. If the vehicle speed is largely lowered by vehicle driver's brake application during such a temporary full or substantially full engagement of the lock-up clutch, the engine speed is accordingly lowered with a decrease in the turbine impeller speed. In this case, the engine may stall or have a knocking tendency. The possibility of the engine stall is particularly high when the fuel cut of the engine is effected together with the slip control of the lock-up clutch, because the fuel cut causes a sudden drop of the engine speed far below the fuel-cut speed, and the engine stalls before the fuel supply is resumed.

SUMMARY OF THE INVENTION

It is therefore a first object of the present invention to provide an apparatus which assures improved stability of control of the amount of slip of a lock-up clutch of a motor vehicle, irrespective of an operation of a fuel-cut device to cut the fuel supply to the vehicle engine.

It is a second object of the present invention to provide an apparatus for controlling the amount of slip of a lock-up clutch of a motor vehicle, which apparatus is capable of preventing an excessive engine braking effect during deceleration of the vehicle where the vehicle driver has no intention to stop the vehicle.

It is a third object of this invention to provide an apparatus for effecting slip control of a lock-up clutch of a motor vehicle, which apparatus is capable of preventing stalling of the vehicle engine due to the slip control of the clutch.

It is a fourth object of this invention to provide an apparatus for effecting fuel cut control of an engine of a motor vehicle, which apparatus is capable of preventing stalling of the vehicle due to the fuel cut of the engine.

The above first object may be achieved according to one aspect of the present invention, which provides an apparatus for controlling an amount of slip of a lock-up clutch disposed between a pump impeller and a turbine impeller in a power transmitting device of a motor vehicle equipped with a fuel-cut device for cutting a fuel supply to an engine while a speed of the engine is higher than a predetermined fuel-cut speed during deceleration of the vehicle, the apparatus including slip control means for controlling the amount of slip of the lock-up clutch during the deceleration of the vehicle such that an actual slip speed of the lock-up clutch coincides with a predetermined target slip speed, the apparatus comprising: (a) deceleration monitoring means for determining whether the vehicle is in a deceleration state following an accelerating state; and (b) timing control means for commanding the slip control means to initiate a slip control operation to control the amount of slip of the lock-up clutch, upon determination of the deceleration monitoring means that the vehicle is in the decelerating state, the timing control means inhibiting the fuel-cut device from initiating a fuel-cut operation to cut the fuel supply to the engine, for a predetermined delay time after the initiation of the slip control operation of the slip control means, for thereby reducing an amount of change of the speed of the engine in an initial portion of the slip control operation.

In the slip control apparatus of the present invention constructed as described above, the timing control means commands the slip control means to initiate the slip control operation to control the amount of slip of the lock-up clutch, at the time when the decelerating state of the vehicle is detected by the deceleration monitoring means. However, the initiation of the fuel-cut operation by the fuel-cut device is inhibited by the timing control means, for the predetermined delay time after the initiation of the slip control operation, so as to reduce the amount or rate of change of the engine speed in an initial period of the slip control operation.

Since the slip control operation of the slip control means is initiated as soon as the deceleration of the vehicle is detected by the deceleration monitoring means, the amount or rate of decrease of the engine speed in the initial period of the slip control operation is considerably reduced. In other words, the slip control operation can be initiated with high stability. Further, since the initiation of the fuel-cut operation is delayed for the predetermined delay time with respect to the initiation of the slip control operation, the amount of change or reduction of the engine torque during the delay time is comparatively small, and the engine torque is held to be almost zero after it is reduced. Accordingly, the amount of slip of the lock-up clutch can be suitably controlled by the slip control means immediately after the initiation of the slip control operation, without having to increase the engagement force of the lock-up clutch.

In one preferred form of the present invention, the timing control means includes time measuring means for measuring a time which has passed after the deceleration monitoring means has determined that the vehicle is in the decelerating state, and delay-time setting means for determining the predetermined delay time such that the delay time is longer when an engine-driven device operated by the engine is in operation than when the engine-driven device is not in operation. In this case, the timing control means commands the fuel-cut device to initiate the fuel-cut operation when the time measured by the time measuring means coincides with the delay time determined by the delay-time setting means. The engine-driven device may be an air conditioner. Generally, the idling speed of the engine is raised when the air conditioner is in operation. In this case, the time before the engine speed has been lowered as a result of the vehicle deceleration is increased. In the present preferred form of the invention, however, the delay time is accordingly increased, and the fuel-cut operation is initiated only after the rate of decrease of the engine speed has been reduced below a predetermined level. Thus, the stability of the slip control of the lock-up clutch is further improved.

In another preferred form of the invention, the timing control means includes a selected one of the following monitoring means: means for determining whether the rate of change of the engine speed has become smaller than a predetermined threshold; means for determining whether a difference between the engine speed and the turbine impeller speed has been substantially zeroed; means for determining whether the rate of change of the output torque of the engine has been substantially zeroed; and means for determining whether the drop of the engine output torque after an idling position switch is turned ON has been completed. In this case, the timing control means inhibits the fuel-cut operation of the fuel-cut device until an affirmative decision is obtained in the selected monitoring means indicated above. The fuel-cut device is operated only after the lock-up clutch has become ready to achieve fast slipping engagement so as to establish the comparatively low target slip speed.

In a further preferred form of the invention, the timing control means includes gradual fuel-cut commanding means for commanding the fuel-cut device to gradually reduce the fuel supply to the engine, to thereby reduce an amount of change of an output torque of the engine due to the fuel-cut operation of the fuel-cut device. For instance, the gradual fuel-cut commanding means is adapted to sequentially effect fuel cut operations to cut the fuel supply to the respective cylinders of the engine, so as to prevent an abrupt change of the engine output torque which would occur if all of the cylinders of the engine are simultaneously subjected to the fuel cut. This arrangement assures improved stability of the slip control of the lock-up clutch even after the fuel-cut device is operated to initiate the fuel-cut operation.

The first object indicated above may also be achieved according to a second aspect of this invention, which provides an apparatus for controlling an amount of slip of a lock-up clutch disposed between a pump impeller and a turbine impeller in a power transmitting device of a motor vehicle equipped with a fuel-cut device for cutting a fuel supply to an engine while a speed of the engine is higher than a predetermined fuel-cut speed during deceleration of the vehicle, the apparatus including slip control means for producing a slip control output for controlling the amount of slip of the lock-up clutch during the deceleration of the vehicle, such that an actual slip speed of the lock-up clutch coincides with a predetermined target slip speed, the slip control output including a feedback control value and a feed-forward control value, the apparatus comprising: (a) fuel-cut monitoring means for determining whether the fuel-cut device is in operation to cut the fuel supply to the engine; and (b) slip control output changing means for restricting the feedback control value of the slip control output of the slip control means during a slip control operation of the slip control means to control the amount of slip of the lock-up clutch during the deceleration of the vehicle, while the fuel-cut monitoring means determines that the fuel-cut device is not in operation, said slip control output changing means cancelling restriction of the feedback control value when the fuel-cut monitoring means determines that the fuel-cut device is in operation.

In the slip control apparatus constructed according to the second aspect of the present invention, the feedback control value of the slip control output of the slip control means is restricted (zeroed or reduced) by the slip control output changing means as long as the fuel-cut monitoring means determines that a fuel-cut operation of the fuel-cut device to cut the fuel supply to the engine has not been initiated. This restriction of the feedback control value is cancelled when the fuel-cut monitoring means determines that the fuel-cut device is operated to initiate the fuel-cut operation.

In the present slip control device, the slip control of the lock-up clutch by the slip control means during deceleration of the vehicle is effected such that the slip control output of the slip control means is restricted in its feedback control value until the fuel-cut operation of the fuel-cut device is initiated. This arrangement assures improved stability of the slip control operation upon or immediately after the initiation of the fuel-cut operation of the fuel-cut device.

The restriction of the feedback control value by the slip control output changing means before the initiation of the fuel-cut operation is interpreted to mean either the zeroing or elimination of the feedback control value or reduction of the feedback control value as compared with the value normally used during the fuel-cut operation.

The slip control output changing means may include gradual changing means for gradually changing or increasing the feedback control value back to the value normally used during the fuel-cut operation, after the fuel-cut operation is initiated. For instance, a relatively small value is used as the feedback control value immediately after the fuel-cut operation is initiated, and then the feedback control value is incremented to the value as calculated according to a predetermined equation used for the slip control operation during the fuel-cut operation. The gradual changing means prevents a sudden or fast change of the feedback control value, and therefore prevents a sudden change of the slip control output of the slip control means, upon or immediately after the initiation of the fuel-cut operation, leading to further improved stability of the slip control of the lock-up clutch immediately after the initiation of the fuel-cut operation.

The second object indicated above may be achieved according to a third aspect of this invention, which provides an apparatus including slip control means for effecting a slip control operation to control an amount of slip of a lock-up clutch disposed between a pump impeller and a turbine impeller in a fluid-filled power transmitting device of a motor vehicle, during deceleration of the vehicle, the vehicle having a fuel-cut device for cutting a fuel supply to an engine during the deceleration of the vehicle, the apparatus comprising: (a) time measuring means for measuring a time which has passed after the vehicle is brought to a decelerating state; (b) brake monitoring means for determining whether a brake is activated to apply a brake to the vehicle; and (c) slip control terminating means for commanding the slip control means to terminate said slip control operation, when a predetermined time has been measured by the time measuring means, if the brake monitoring means determines that the brake is not activated within the predetermined time.

In the slip control apparatus constructed according to the third aspect of the invention, the time which has passed after the vehicle is brought to the decelerating state (i.e., after the slip control of the lock-up clutch is initiated) is measured by the time measuring means. Further, the brake monitoring means is provided to determine whether the brake is activated to brake the vehicle. If the brake is not activated within the predetermined time after the vehicle is brought to the decelerating state, the slip control terminating means commands the slip control means to terminate its slip control operation when the predetermined time has been measured by the time measuring means. If the brake is activated within the predetermined time, the slip control means is permitted to continue the slip control of the lock-up clutch even after the predetermined time has passed.

If the vehicle driver has released the accelerator pedal to run the vehicle in the coasting mode but has no intention to stop the vehicle, the continuation of the slip control of the lock-up clutch together with the fuel cut of the engine for a long time will result in an increase in the engine braking effect which is not expected by the vehicle driver who desires a coasting run of the vehicle. In the present slip control apparatus, therefore, the slip control of the lock-up clutch is terminated if the predetermined time has passed without activation of the brake by the vehicle driver, since the absence of the brake activation within the predetermined time indicates the absence of the vehicle driver's intention to stop the vehicle after releasing of the accelerator pedal. Thus, the present arrangement is effective to assure improved driving comfort as felt by the vehicle driver during coasting of the vehicle with the accelerator pedal placed in the engine idling position. That is, the present arrangement is effective to prevent an excessive engine braking effect during a coasting run of the vehicle, which excessive engine braking effect is not expected by the vehicle driver who has released the accelerator pedal but has no intention to stop the vehicle.

On the other hand, the brake activation during the predetermined time indicates the vehicle driver's intention to stop the vehicle after releasing of the accelerator pedal. According to the present slip control apparatus, the slip control of the lock-up clutch is continued in this case, since the increase in the engine braking effect as a result of the continued slip control of the lock-up clutch is desired by the vehicle driver who has depressed the brake pedal to stop the vehicle.

The second object indicated above may also be achieved according to a fourth aspect of this invention, which provides an apparatus including slip control means for effecting a slip control operation to control an amount of slip of a lock-up clutch disposed between a pump impeller and a turbine impeller in a fluid-filled power transmitting device of a motor vehicle, during deceleration of the vehicle, the vehicle having a fuel-cut device for cutting a fuel supply to an engine during the deceleration of the vehicle, the apparatus comprising: (a) time measuring means for measuring a time which has passed after the vehicle is brought to a decelerating state; (b) brake monitoring means for determining whether a brake is activated to apply a brake to the vehicle; (c) vehicle speed detecting means for detecting a running speed of the vehicle; and (c) slip control terminating means for commanding the slip control means to terminate the slip control operation, when a predetermined time has been measured by the time measuring means, if the running speed of the vehicle detected by the vehicle speed detecting means is lower than a predetermined threshold upon expiration of the predetermined time and if the brake monitoring means determines that the brake is not activated within the predetermined time.

The present slip control apparatus according to the fourth aspect of the invention provides the same advantage as described above with respect to the apparatus according to the third aspect of the invention. That is, the present apparatus is effective to prevent the deterioration of the driving comfort as felt by the vehicle driver during coasting of the vehicle which would occur if the slip control of the lock-up clutch were continued for a long time without the brake activation, namely, without the vehicle driver's intention to stop the vehicle. In the present apparatus, however, the slip control of the lock-up clutch is not terminated even if the brake is not activated within the predetermined time, unless the vehicle speed upon expiration of the predetermined time is lower than the predetermined threshold. This arrangement is based on a fact that when the vehicle speed is relatively low, the vehicle driver is more likely to feel an increase in the vehicle deceleration due to an increase in the engine braking effect which is caused the continued slip control of the lock-up and which may deteriorate the driving comfort as felt by the vehicle driver.

The decelerating state of the vehicle may be detected by determining whether the engine is bought to an idling state. This determination may be effected by determining whether a throttle valve of the engine or the accelerator pedal is placed in the engine idling position.

The time measuring means indicated above with respect to the third and fourth aspects of the invention may be adapted to measure the time which has passed after the engine is brought to the idling state.

In one preferred form of the slip control apparatus according to the third or fourth aspect of this invention described above, delay means is further provided for delaying the initiation of a fuel-cut operation of the fuel-cut device to cut the fuel supply to the engine, by a predetermined delay time with respect to a moment when the vehicle is brought to the decelerating state.

In the above form of the invention, the fuel-cut operation of the fuel-cut device is initiated the predetermined time after the vehicle deceleration is commenced, that is, after the slip control operation of the slip control means is initiated. This delay of the fuel cut of the engine with respect to the slip control of the lock-up clutch is effective to reduce the degree of deceleration of the vehicle as felt by the vehicle driver who has released the accelerator pedal. The delay time may be shorter than the predetermined time indicated above with respect to the slip control terminating means.

The third object indicated above may be achieved according to a fifth aspect of this invention, which provides an apparatus including slip control means for effecting a slip control operation to control an amount of slip of a lock-up clutch disposed between a pump impeller and a turbine impeller in a fluid-filled power transmitting device of a motor vehicle, while a speed of said turbine impeller is higher than a threshold speed during deceleration of the vehicle, the apparatus comprising: (a) slip speed detecting means for detecting a slip speed of the lock-up clutch during the slip control operation of the slip control means, the slip speed being a difference which is equal to a speed of the pump impeller minus the speed of the turbine impeller; (b) threshold speed setting means for determining the threshold speed of the turbine impeller such that the threshold speed is higher when an absolute value of the slip speed detected by the slip speed detecting means is relatively small than when the absolute value of the slip speed is relatively large; and (c) slip control terminating means for commanding the slip control means to terminate the slip control operation, when the speed of the turbine impeller falls below the threshold speed determined by the threshold speed setting means.

In the present slip control apparatus according to the fifth aspect of the invention, the amount of slip of the lock-up clutch is controlled by the slip control means while the speed of the turbine impeller is higher than the threshold speed during deceleration of the vehicle. During the slip control operation of the slip control means, the actual slip speed of the lock-up clutch (pump impeller speed—turbine impeller speed) is detected by the slip speed detecting means. Based on the detected slip speed, the threshold speed setting means determines the threshold speed such that the determined threshold speed is higher when the absolute value of the detected slip speed (i.e., the amount of slip of the lock-up clutch) is relatively small than when the absolute value is relatively large. For example, the threshold speed is determined to be higher when the lock-up clutch is almost fully engaged with the slip speed being a very small negative value or substantially zero, than when the lock-up clutch is partially slipping with a relatively high negative slip speed (turbine impeller speed being higher than pump impeller or engine speed). When the lock-up clutch is almost fully engaged, therefore, the slip control means is commanded by the slip control terminating means to terminate the slip control operation even if the turbine impeller speed is still relatively high, namely, even if the engine speed is relatively high. In this respect, it is noted that the engine speed is almost equal to the turbine impeller speed because of the almost full engagement of the lock-up clutch. Accordingly, if the vehicle brake is activated with the lock-up clutch almost fully engaged with substantially no slip amount, the slip control operation is terminated when the turbine impeller speed has been lowered down to the relatively high threshold speed. Thus, the present arrangement prevents the engine speed from being lowered to such a low level that may cause the engine to stall when the brake is activated while the vehicle is in deceleration with the lock-up clutch being almost fully engaged under the control of the slip control means. Therefore, the engine stall due to the slip control of the lock-up clutch during vehicle deceleration can be prevented.

The threshold speed of the turbine impeller may be determined such that the threshold speed varies as a function of the absolute value of the detected slip speed or the slip amount of the lock-up clutch. For example, the threshold speed setting means determines the threshold speed according to a stored data map which represents a predetermined relationship between the threshold speed and the amount of slip of the lock-up clutch (absolute value of the detected slip speed).

The fourth object indicated above may be achieved according to a sixth aspect of this invention, which provides an apparatus including a fuel-cut device for effecting a fuel-cut operation to cut a fuel supply to an engine of a motor vehicle while a speed of the engine is higher than a threshold speed during deceleration of the vehicle, the vehicle being equipped with a fluid-filled power transmitting device including a pump impeller, a turbine impeller, and a lock-up clutch disposed between the pump and turbine impellers, the apparatus comprising: (a) slip speed detecting means for detecting a slip speed of the lock-up clutch during the fuel-cut operation of the fuel-cut device, the slip speed being a difference which is equal to a speed of the pump impeller minus a speed of the turbine impeller; (b) threshold speed setting means for determining the threshold speed such that the threshold speed is higher when an absolute value of the slip speed detected by the slip speed detecting means is relatively small than when the absolute value is relatively large; and (c) fuel-cut terminating terminating means for commanding the fuel-cut device to terminate the fuel-cut operation, when the speed of the engine falls below the threshold speed determined by the threshold speed setting means.

In the fuel-cut control apparatus constructed according to the sixth aspect of this invention, the fuel-cut operation of the fuel-cut device to cut the fuel supply to the engine is effected while the engine speed is higher than the threshold level during deceleration of the vehicle. During the fuel-cut operation of the fuel-cut device, the actual slip speed of the lock-up clutch (pump impeller speed—turbine impeller speed) is detected by the slip speed detecting means. Based on the detected slip speed, the threshold speed setting means determines the threshold speed of the engine such that the determined threshold speed is higher when the absolute value of the detected slip speed (i.e., slip amount) is relatively small than when the absolute value is relatively large. In this arrangement, the threshold speed is determined to be relatively high when the torque transmitted from the turbine impeller to the pump impeller during vehicle deceleration is relatively large, that is, when the absolute value of the negative slip speed (amount of slip of the lock-up clutch) is relatively small. When the transmission torque of the fluid-filled power transmitting device is relatively large, therefore, the fuel-cut device is commanded by the fuel-cut terminating means to terminate the fuel-cut operation even if the engine speed is still relatively high. Accordingly, if the vehicle brake is activated when the transmission torque of the power transmitting device is relatively large with a relative small negative slip speed of the lock-up clutch, the fuel cut of the engine is terminated when the engine speed has been lowered down to the relatively high threshold speed. Consequently, the fuel supply to the engine is resumed before the engine speed is lowered down to such a low level that may cause the engine to stall if the vehicle brake is activated during vehicle deceleration with a relatively small amount of slip of the lock-up clutch while the fuel-cut device is in operation. When the slip amount of the lock-up clutch is relatively large and the transmission torque of the power transmitting device is relatively small, the brake application to the vehicle under deceleration during the fuel cut of the engine will not cause a sudden drop of the engine speed, though the turbine impeller speed is lower at a higher rate. Therefore, the fuel cut of the engine may be continued for a relatively long time, that is, until the engine speed is comparatively slowly lowered down to the relatively low threshold speed at which the fuel supply to the engine is resumed. Therefore, the engine is prevented from stalling even if the threshold speed is set to be relatively low when the amount of slip of the lock-up clutch is relatively small.

The threshold speed of the engine may be determined such that the threshold speed varies as a function of the absolute value of the detected slip speed or the slip amount of the lock-up clutch. For example, the threshold speed setting means determines the threshold speed according to a stored data map which represents a predetermined relationship between the threshold speed and the amount of slip of the lock-up clutch (absolute value of the detected slip speed).

BRIEF DESCRIPTION OF THE DRAWINGS

The above and optional objects, features, advantages and technical significance of the present invention will be better understood by reading the following detailed description of presently preferred embodiments of the invention, when considered in conjunction of the accompanying drawings, in which:

FIG. 2 is a table indicating a relationship between the operating positions of an automatic transmission connected to the torque converter and the respective combinations of the operating states of first and second solenoid-operated valves of the slip control apparatus;

DETAILED DESCRIPTION OF THE PREFERRED EMBODIMENTS

Figure 1:
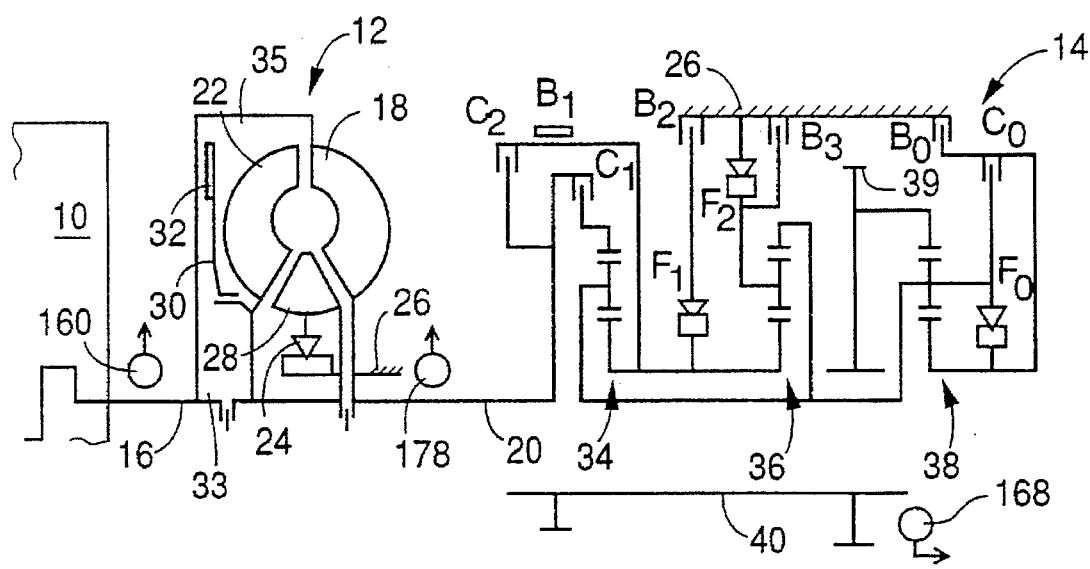
FIG. 1 is a schematic view illustrating a part of a power transmitting system of a motor vehicle, which incorporates a torque converter having a lock-up clutch to be controlled by a slip control apparatus constructed according to a first embodiment of the present invention.

Referring first to the schematic view of FIG. 1, there is shown a part of a power transmitting system of a motor vehicle, wherein power generated by an engine 10 is transmitted to a differential gear device and drive wheels through a torque converter 12 equipped with a lock-up clutch 32, and an automatic transmission 14 which includes three planetary gear sets to selectively establish a plurality of operating conditions (gear positions).

The torque converter 12 includes; a pump impeller 18 connected to a crankshaft 16 of the engine 10; a turbine impeller 22 fixed to an input shaft of the automatic transmission 14 and rotatable by the pump impeller 18; a stator impeller 28 fixed to a stationary member in the form of a housing 26 through a one-way clutch 24; and the above-indicated lock-up clutch 32 connected to the input shaft 20 through the turbine impeller 22. The pump impeller 18 includes a radially outer portion which is U-shaped in cross section, and a plurality of curved vanes which are arranged in the circumferential direction and formed so as to cause a flow of a working oil, which flow includes a component moving toward the turbine impeller 22 on the side of the engine 10. The turbine impeller 22 includes a plurality of curved vanes opposed to the vanes of the pump impeller 18. In operation of the torque converter 12, the turbine impeller 22 is rotated by the oil flow from the vanes of the pump impeller 18 rotated by the engine 10. The lock-up clutch 32 includes a piston 30 which engages a hub of the turbine impeller 22 such that the piston 30 is axially slidable relative to and rotatable with the turbine impeller 22.

The piston 30 of the lock-up clutch 32 divides an interior of the torque converter 12 into two oil chambers 33 and 35. The lock-up clutch 32 is released and engaged by axial movements of the piston 32 depending upon a difference between oil pressures in these two oil chambers 33, 35, which will be hereinafter referred to as a releasing oil chamber 33 and an engaging oil chamber 35, respectively. Described more specifically, the piston 30 is retracted to its fully retracted position when the pressure in the releasing oil chamber 33 is increased while the engaging oil chamber 35 is drained. When the pressure in the engaging oil chamber 35 is increased while the releasing oil chamber 33 is held at the lowest level, the piston 30 is advanced to its fully advanced position. In the fully retracted position of the piston 30, the lock-up clutch 32 is placed in its fully released position in which the torque received by the pump impeller 18 is amplified or boosted at a ratio depending upon the ratio of the input and output speeds of the torque converter 12. In the fully advanced position of the piston 30, the lock-up clutch 32 is placed in the fully engaged position in which the frictional coupling portion of the clutch 32 is forced against the radially outer U-shaped portion of the pump impeller 18, whereby the pump impeller 18 is directly connected to the input shaft 20, that is, the crankshaft 16 as an input member of the torque converter 12 is directly connected to the input shaft 20 of the transmission 14, which serves as an output member of the torque converter 12. When the pressure in the releasing oil chamber 33 is increased to a predetermined level while the pressure in the engaging oil chamber 35 is held at a higher level, the piston 30 is advanced to a predetermined position in which the frictional coupling portion of the lock-up clutch is located near the corresponding coupling portion (radially outer U-shaped portion) of the pump impeller 18. The predetermined level of the pressure in the releasing oil chamber 33 indicated above is determined by a second term ("feed forward term") of a right member of an equation (2) which will be described.

The automatic transmission 14 includes: the input shaft 20, a first, a second and a third planetary gear set 34, 36, 38;

an output gear 39 which rotates with a ring gear of the third planetary gear set 38; and an output shaft in the form of a counter shaft 40 which connects the output gear 39 and the differential gear device. The planetary gear sets 34, 36, 38 include components which are connected integrally with each other, and components which are connected to each other when three clutches C0, C1, C2 are selectively engaged. The planetary gear sets 34, 36, 38 also include components which are fixed or connected to the housing 26 and thereby inhibited from rotating when four brakes B0, B1, B2, B3 are selectively engaged. The planetary gear sets 34, 36, 38 further include components which are connected to each other or to the housing 26 through three one-way clutches F0, F1, F2, depending upon the rotating directions of the components.

Each of the clutches C0, C1, C2 and brakes B0, B1, B2, B3 may consist of a multiple-disk clutch, or a band brake which uses two bands wound in opposite directions. These clutches and brakes are operated by respective hydraulically operated actuators, which are controlled by an electronic transmission controller 184 shown in FIG. 3 (which will be described), so as to selectively establish a plurality of operating positions of the automatic transmission 14. That is, the automatic transmission 14 has four forward drive positions, first-speed ("1st") , second-speed ("2nd"), 3rd-speed ("3rd") and overdrive ("O/D") positions, and one backward drive position "R", as indicated in FIG. 2. The four forward drive positions "1st", "2nd", "3rd" and "O/D" have respective different speed ratios I which decrease in the order of description. The speed ratio I is defined as the speed of the input shaft 20 divided by the speed of the counter shaft (output shaft) 40.

It is to be noted that the lower halves of the torque converter 12 and automatic transmission 14 and the upper half of the counter shaft 40 are not shown in FIG. 1 in the interest of simplification, since these elements 12, 14, 40 are symmetrical with respect to their axes of rotation.

Referring next to the block diagram of FIG. 3, there will be described a control system provided to control the engine 10, lock-up clutch 32 and automatic transmission 14 of the motor vehicle. The control system includes the electronic transmission controller 184 indicated above, which is adapted to control a hydraulic control device 44. The hydraulic control device 44 includes a transmission control circuit for shifting the automatic transmission 14 to an appropriate one of the operating positions, and a lock-up clutch control circuit for controlling the operating state of the lock-up clutch 32. The transmission control circuit is provided with a first and a second solenoid-operated valve S1, S2, which have respective solenoid coils. The clutches C0, C1, C2 and brakes B0, B1, B2, B3 are selectively engaged to selectively establish the operating positions ("1st", "2nd", "3rd" and "O/D") of the transmission 14, depending upon respective combinations of the operating states of the first and second solenoid-operated valves S1, S2, as indicated in FIG. 2. In this figure, "o" indicates the energization of the solenoid coils of the valves S1, S2 or the engagement of the clutches and brakes.

Figure 4:
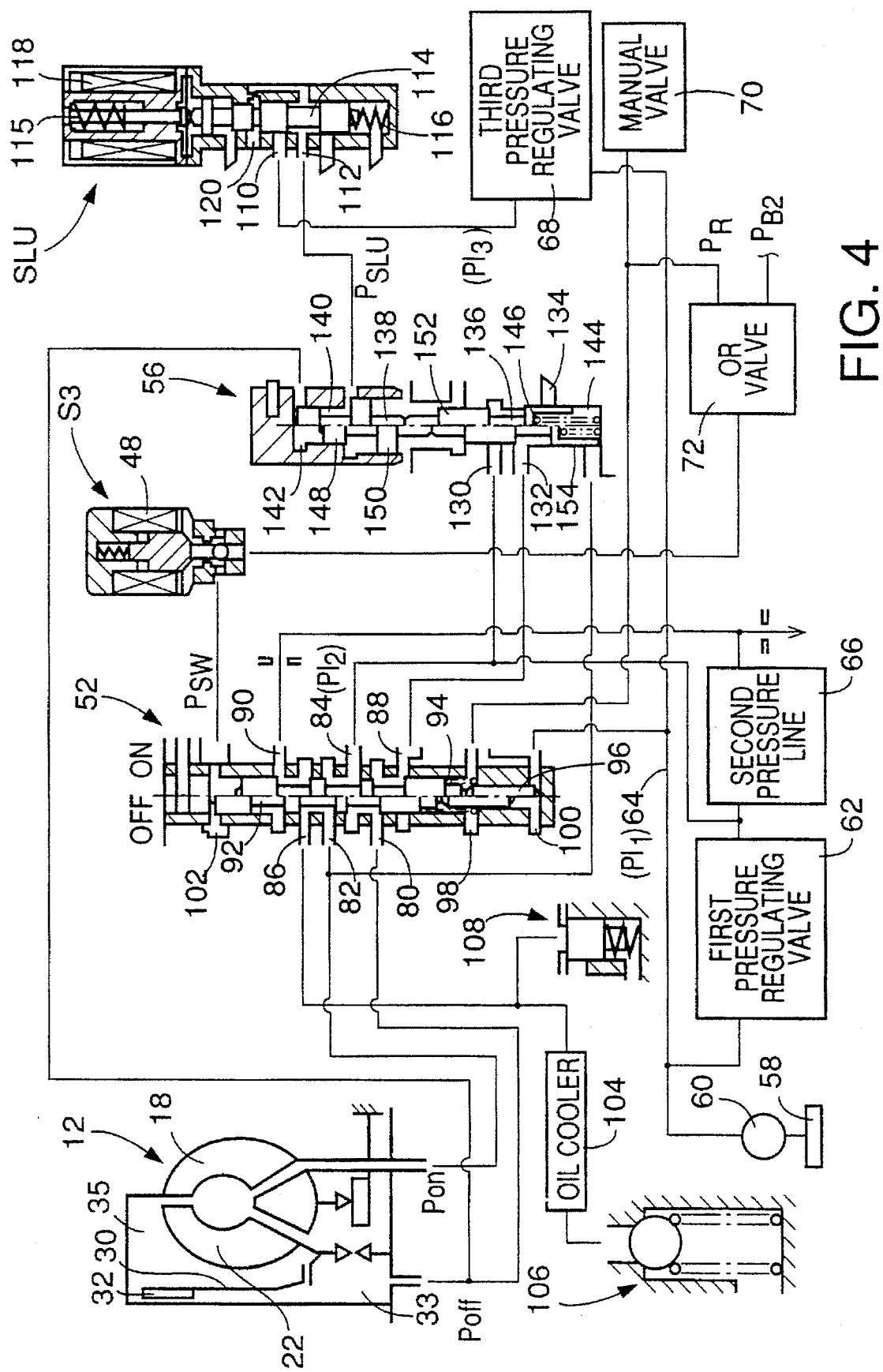
FIG. 4 is a view illustrating a part of a hydraulic control device shown in FIG. 3, which incorporates a circuit for controlling the lock-up clutch.
Figure 5:
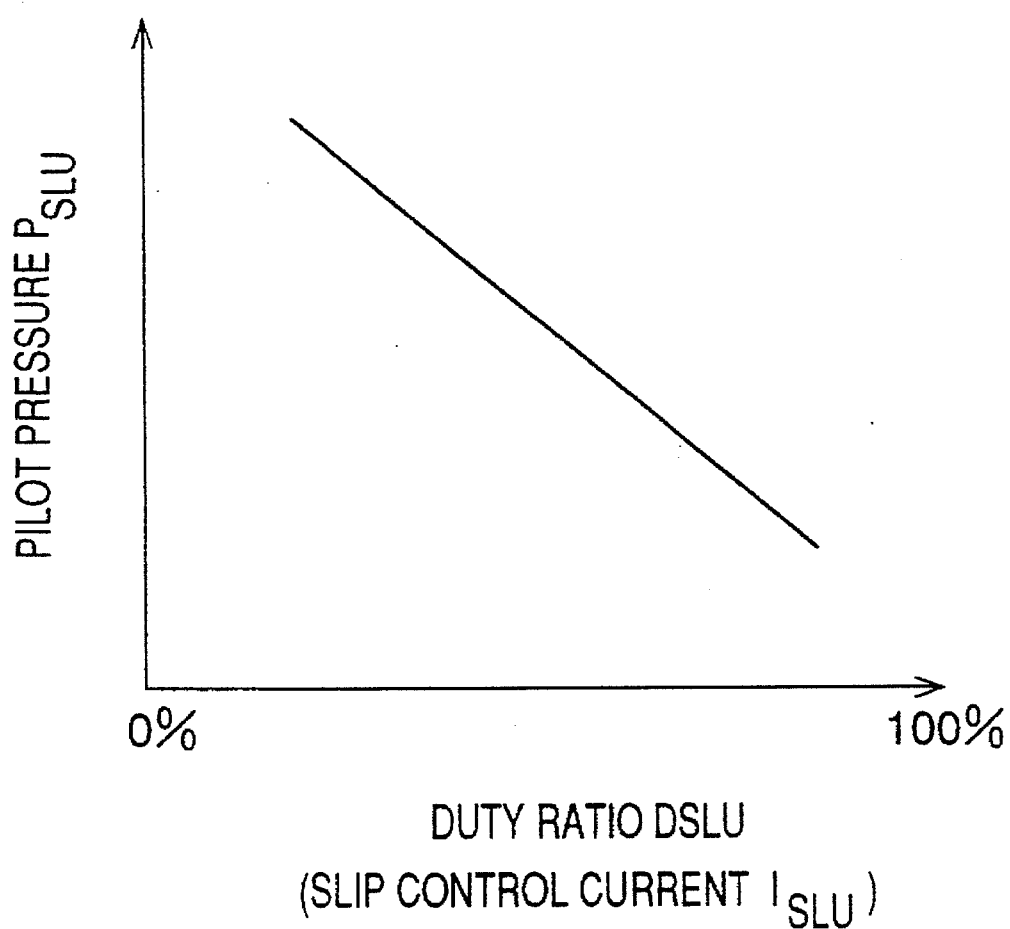
FIG. 5 is a graph indicating an output characteristic of a linear solenoid valve provided in the lock-up clutch control circuit of FIG. 4.

The lock-up clutch control circuit of the hydraulic control device 44 includes a third solenoid-operated valve S3, a lock-up relay valve 52, a linear solenoid valve SLU, and a lock-up clutch control valve 56, as shown in FIG. 4. The third solenoid-operated valve S3 has a solenoid coil 48 which is turned on and off. When the coil 48 is on, the valve 53 generates a LOCK-UP SWITCHING pressure $P_{SW}$. The lock-up relay valve 52 has a releasing state and an engaging state for releasing and engaging the lock-up clutch 32, respectively, depending upon whether the pilot pressure $P_{SW}$ is generated by the valve S3. The linear solenoid valve SLU is adapted to generate a SLIP CONTROL pilot pressure $P_{SLU}$ corresponding to a SLIP CONTROL current $I_{SLU}$ supplied from the transmission controller 184. The lock-up clutch control valve 56 is adapted to regulate a pressure difference ΔP between the pressures in the engaging and releasing oil chambers 35, 33 of the torque converter 12, according to the SLIP CONTROL pilot pressure $P_{SLU}$ received from the linear solenoid valve SLU, for thereby controlling an amount of slip of the lock-up clutch 32.

As shown in FIG. 4, the hydraulic control device 44 includes a pump 60 for pressuring a working oil sucked from a suitable reservoir through a strainer 58. The pump 60 is driven by the engine 10. The pressure of the oil delivered by the pump 60 is adjusted to a first line pressure Pl1 by a first pressure regulating valve 62 of an overflow type. The first pressure regulating valve 62 is arranged to receive a THROTTLE pilot pressure indicative of an opening TAP of a first throttle valve 166 (FIG. 3), and regulate the first line pressure Pl1 in a first pressure line 64 such that the pressure Pl1 increases with the THROTTLE pilot pressure. The hydraulic control device 44 further has a second pressure regulating valve 66 of an overflow type, which is adapted to regulate the pressure of the oil received from the first pressure regulating valve 62, to a second line pressure Pl2 according to the THROTTLE pressure, so that the second line pressure Pl2 corresponds to the output torque of the engine 10. The device 44 further has a third pressure regulating valve 68, which is a pressure reducing valve adapted to reduce the first line pressure Pl1 to a predetermined third line pressure Pl3.

The motor vehicle has a shift lever 174 (FIG. 3) which has six operating positions "P" (PARKING), "R" (REVERSE), "N" (NEUTRAL), "D" (DRIVE), "S" (SECOND) and "L" (LOW), as indicated in FIG. 2. The hydraulic control device 44 includes a manual valve 70 (FIG. 4) adapted to generate a REVERSE pressure $P_R$ when the shift lever 174 is placed in the REVERSE position "R" (which is the backward drive position referred to above with respect to the automatic transmission 14). The device 44 also includes an OR valve 72 which is adapted to generate a higher one of a BRAKE B2 pressure $P_{B2}$ and the REVERSE pressure $P_R$, which serves as the LOCK-UP SWITCHING pilot pressure $P_{SW}$ generated when the valve S3 is turned ON as explained below in detail. The BRAKE B2 pressure $P_{B2}$ is generated to engage the brake B2 for establishing the second-speed ("2nd"), third-speed ("3rd") and overdrive ("O/D") positions.

The lock-up relay valve 52 has: a releasing port 80 communicating with the releasing oil chamber 33; an engaging port 82 communicating with the engaging oil chamber 35; an input port 84 adapted to receive the second line pressure Pl2; a first drain port 86 through which the oil in the engaging oil chamber 35 is discharged when the lock-up clutch 32 is released; a second drain port 88 through which the oil in the releasing oil chamber 33 is discharged when the lock-up clutch 32 is engaged; a supply port 90 adapted to receive the oil discharged from the second pressure regulating valve 66 so that the oil is cooled during engagement of the lock-up clutch 32; a spool 92 operable between an ON position and an OFF position, for switching the mutual communication or connection of the ports indicated above; a spring 94 for biasing the spool 92 toward the OFF position; a plunger 96 abuttable on the end of the spool 92 on the side of the spring 94; an oil chamber 98 defined between the above-indicated end of the spool 92 and the opposed end of the plunger 96, and adapted to receive the REVERSE pressure $P_R$ from the manual valve 70; an oil chamber 100 partially defined by the other end of the plunger 96 and adapted to receive the first line pressure Pl1; and an oil chamber 102 partially defined by the other end of the spool 92 and adapted to receive the LOCK-UP SWITCHING pressure $P_{SW}$ from the third solenoid-operated valve S3, for generating a thrust force for moving the spool 92 toward the ON position.

The third solenoid-operated valve S3 has a ball which is seated on a valve seat to disconnect a line communicating with the oil chamber 102 of the lock-up relay valve 52 and the OR valve 72 when the solenoid coil 48 is de-energized or OFF. In this state, the LOCK-UP SWITCHING pilot pressure $P_{SW}$ is not applied to the oil chamber 102. When the coil 48 is energized or ON, the ball is unseated to permit the communication between the OR valve 72 and the oil chamber 102, whereby the LOCK-UP SWITCHING pressure $P_{SW}$ is applied to the oil chamber 102. In the OFF state of the valve S3, therefore, the spool 92 of the lock-up relay valve 52 is moved to its OFF position by the biasing force of the spring 94 and a force based on the first line pressure Pl1 in the oil chamber 100, whereby the input port 84 communicates with the releasing port 80 while the first drain port 86 communicates with the engaging port 82. As a result, a pressure Poff in the releasing oil chamber 33 is made higher than a pressure Pon in the engaging oil chamber 35, to thereby release the lock-up clutch 32, while at the same time the engaging chamber 35 is drained through the first drain port 86, an oil cooler 104 and a check valve 106.

In the ON state of the valve S3, on the other hand, the LOCK-UP SWITCHING pilot pressure $P_{SW}$ is applied to the oil chamber 102, and the spool 92 is moved by a force based on the pressure $P_{SW}$ against the biasing force of the spring 94 and the force based on the first line pressure Pl1 in the oil chamber 100, whereby the input port 84 communicates with the engaging port 82 while the first and second drain ports 86, 88 communicates with the supply and releasing ports 90, 80, respectively. As a result, the pressure Pon in the engaging oil chamber 35 is made higher than the pressure Poff in the releasing oil chamber 33, to thereby engage the lock-up clutch 32, while at the same time the releasing oil chamber 33 is drained through the second drain port 88 and the lock-up clutch control valve 56.

The linear solenoid valve SLU is a reducing valve adapted to reduce the predetermined third line pressure Pl3 to the SLIP CONTROL pilot pressure $P_{SLU}$, such that the pilot pressure $P_{SLU}$ increases with an increase in the SLIP CONTROL current $I_{SLU}$ supplied from the transmission controller 184, namely, increases with an increase in a duty ratio $D_{SLU}$ of the linear solenoid valve SLU. The thus controlled pilot pressure $P_{SLU}$ is applied to the lock-up clutch control valve 56. The linear solenoid valve SLU has: a supply port 110 adapted to receive the third line pressure Pl3; an output port 112 from which the SLIP CONTROL pilot pressure $P_{SLU}$ is applied to the valve 56; a spool 114 for closing and opening the ports 110, 112; a spring 115 for biasing the spool 114 in a valve closing direction; a spring 116 for biasing the spool 114 in a valve opening direction by a force smaller than that of the spring 115; a solenoid coil 118 for biasing the spool 114 in the valve opening direction by a force determined by the SLIP CONTROL current $I_{SLU}$; and an oil chamber 120 adapted to receive a feedback pressure (SLIP CONTROL pilot pressure $P_{SLU}$) which biases the spool 114 in the valve closing direction. The spool 114 is moved to a position of equilibrium between a sum of the biasing forces of the solenoid coil 118 and the spring 116 and a sum of the biasing force of the spring 115 and a force based on the feedback pressure $P_{SLU}$.

The lock-up clutch control valve 56 has: a line pressure port 130 adapted to receive the second line pressure Pl2; an input port 132 adapted to receive the oil discharged from the releasing oil chamber 33 through second drain port 88 of the valve 52; a drain port 134 through which the oil received by the input port 132 is discharged; a spool 136 operable between a first position (indicated at left in FIG. 4) and a second position (indicated at right in FIG. 4); a plunger 138 abuttable on the spool 136 for biasing the spool 136 toward the first position; an oil chamber 140 adapted to receive the SLIP CONTROL pilot pressure $P_{SLU}$ for biasing the plunger 138 so as to generate a thrust force which biases the spool 136 toward the first position; an oil chamber 142 adapted to receive the oil pressure Poff in the releasing oil chamber 33, for biasing the plunger 138 so as to generate a thrust force which biases the spool 136 toward the first position; an oil chamber 144 adapted to receive the oil pressure Pon in the engaging oil chamber 35, for generating a thrust force for biasing the spool 136 toward the second position; and a spring 146 received in the oil chamber 144, for biasing the spool 136 toward the second position.

In the first position of the spool 136 of the lock-up clutch control valve 56, the input port 132 communicates with the drain port 134 to cause the releasing oil chamber 33 to be drained, for thereby increasing the pressure difference ΔP (=Pon−Poff) of the oil chambers 33, 35. In the second position of the spool 136, the input port 132 communicates with the line pressure port 130 to cause the second line pressure Pl2 to be applied to the releasing oil chamber 33, for thereby reducing the pressure difference ΔP.

The plunger 138 has a first land 148 adjacent to the oil chamber 142, and a second land 150 remote from the oil chamber 142. The first land 148 has a cross sectional area A1, and the second land 150 has a cross sectional area A2 larger than the area A1. The spool 136 has a third land 152 adjacent to the pilot pressure oil chamber 140, and a fourth land 154 remote from the oil chamber 140. The third land 152 has a cross sectional area A3, and the fourth land 154 has a cross sectional area equal to the cross sectional area A1. In this arrangement of the lock-up clutch control valve 56, the plunger 138 and the spool 136 are moved together as a unit with the plunger 138 held in abutting contact with the spool 136. With the movement of the plunger and spool 138, 136, the pressure difference ΔP (=Pon−Poff) on the opposite sides of the piston 30 of the lock-up clutch 32 is controlled depending upon the SLIP CONTROL pilot pressure $P_{SLU}$ generated by the linear solenoid valve SLU. The pressure difference ΔP changes with the pilot pressure $P_{SLU}$ as shown in FIG. 6, at a rate or gradient represented by a value (A2−A1)/A1 included in the following equation (1):

$$\Delta P = Pon - Poff = [(A2-A1)/A1]P_{SLU} - Fs/A1 \quad (1)$$

where, Fs: biasing force of the spring 146.

Figure 6:
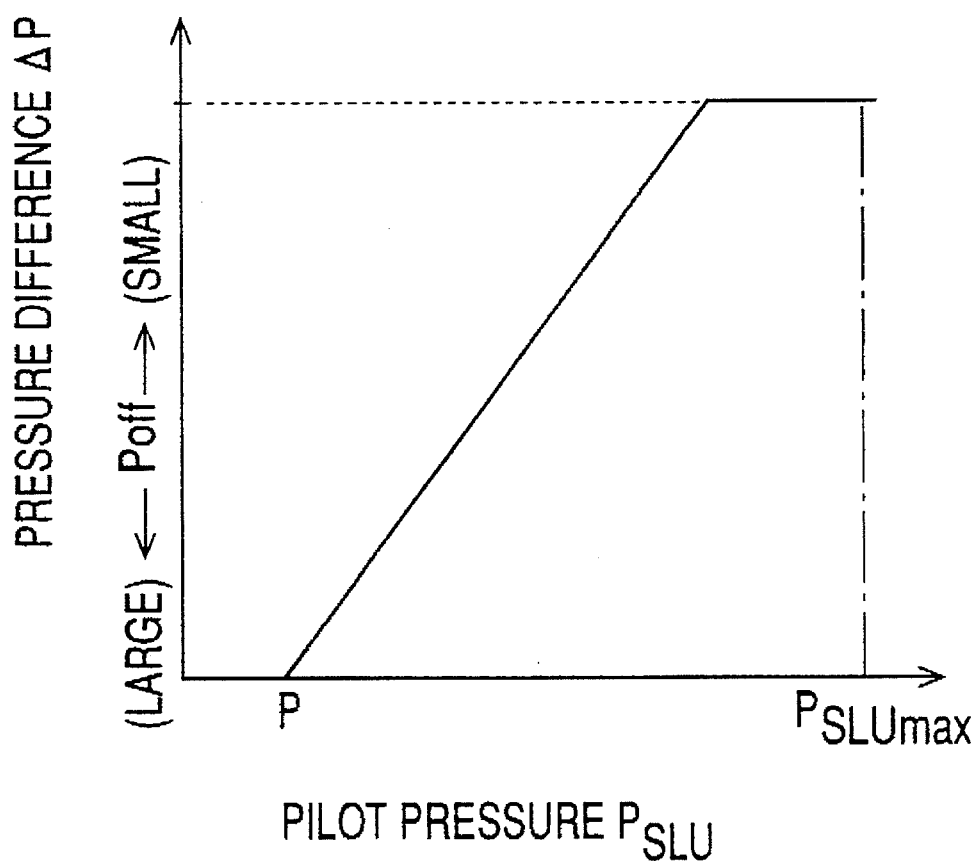
FIG. 6 is a graph indicating an output characteristic of a lock-up clutch control valve provided in the lock-up clutch control circuit of FIG. 4, namely, a relationship between a pilot pressure $P_{SLU}$ received by the lock-up clutch control valve and a pressure difference $\Delta P$ of engaging and releasing oil chambers of the lock-up clutch.

The graph of FIG. 6 indicates the output characteristic of the lock-up clutch control valve 56, namely, the relationship between the pressure difference ΔP generated by the valve 56 and the SLIP CONTROL pilot pressure $P_{SLU}$ generated by the valve SLU. While the lock-up clutch control valve 56 is ON with the spool 136 placed in the first position, an increase in the pilot pressure $P_{SLU}$ results in an increase in the pressure difference ΔP of the engaging and releasing oil chambers 35, 33, and thereby causes a decrease in a slip speed $N_{SLP}$ of the lock-up clutch 32, while a decrease in the pilot pressure $P_{SLU}$ causes an increase in the slip speed $N_{SLP}$.

The slip speed $N_{SLP}$ is a difference $(N_P - N_T)$ between a speed $N_P$ of the pump impeller 18 (speed $N_E$ of the engine 10) and a speed $N_T$ of the turbine impeller 22 (speed Nin of the input shaft 20).

Figure 3:
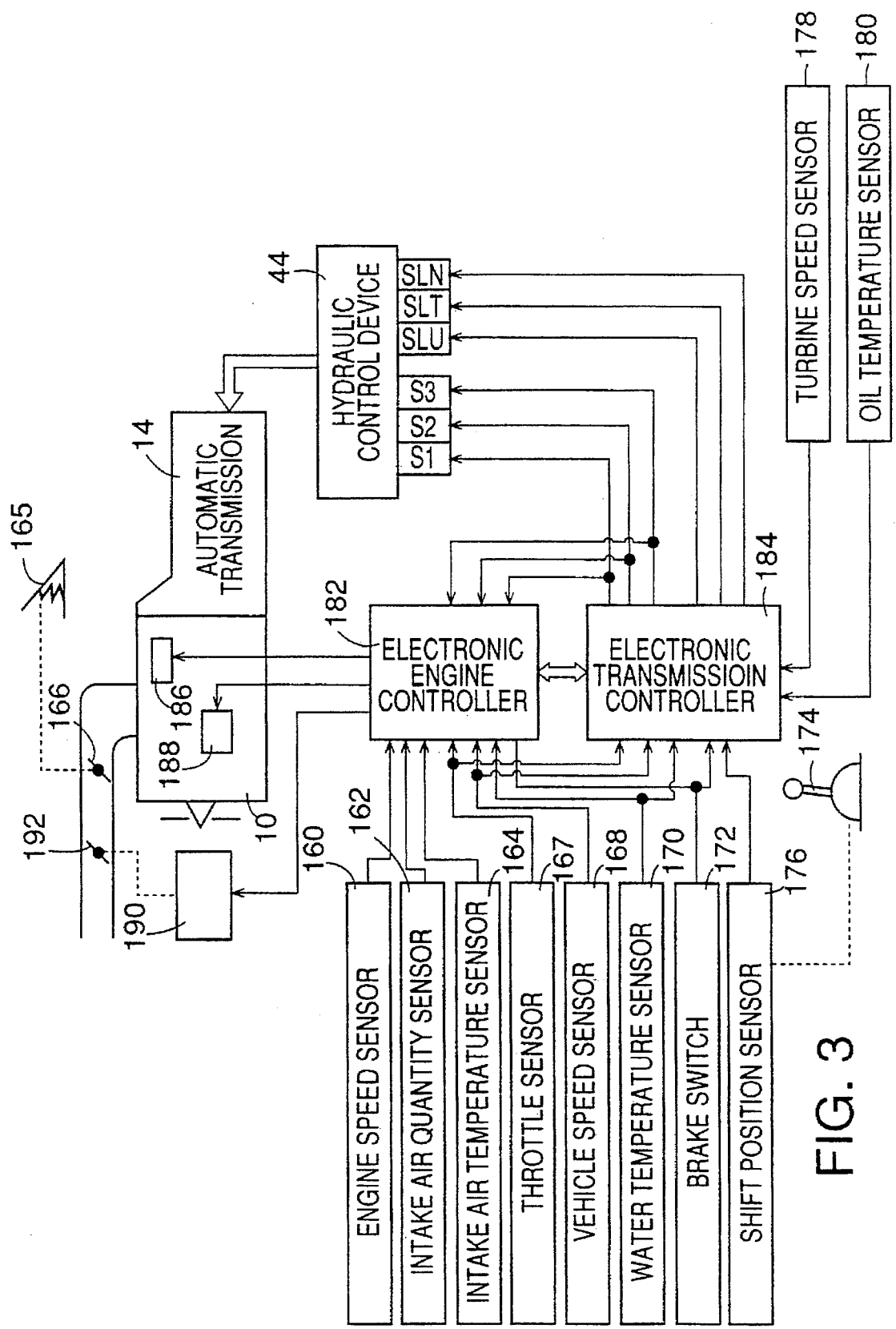
FIG. 3 is a block diagram showing a control system for the motor vehicle, which includes a transmission controller incorporating the slip control apparatus for the lock-up clutch.

Referring back to the block diagram of FIG. 3, the motor vehicle has various sensors and switches including: an engine speed sensor 160 for detecting the speed $N_E$ of the engine 10, that is, speed $N_P$ of the pump impeller 18; an intake air quantity sensor 162 for detecting a quantity Q of an intake air sucked into the engine 10 through an intake pipe; an intake air temperature sensor 164 for detecting a temperature $T_{AIR}$ of the intake air; a throttle sensor 167 for detecting the opening TAP of the first throttle valve 166 operated by an accelerator pedal 165, the throttle sensor 167 being equipped with an idling position switch for detecting the idling position of the throttle valve 166; a vehicle speed sensor 168 for detecting a running speed V of the vehicle on the basis of a speed Nout of the output shaft 40 of the automatic transmission 40; a coolant temperature sensor 170 for detecting a temperature $T_{HW}$ of a coolant water of the engine 10; a brake switch 172 for detecting an operation of a brake pedal; a shift position sensor 176 for detecting a currently selected operating position Ps of the automatic transmission 40, namely, a currently selected one of the operating positions "L", "S", "D", "N", "R" and "P" of the shift lever 174; a turbine speed sensor 178 for detecting the speed $N_T$ of the turbine impeller 22, that is, the speed Nin of the input shaft 20 of the transmission 20; and an oil temperature sensor 180 for detecting a temperature $T_{OIL}$ of the working oil in the hydraulic control device 44. The output signals generated by the above sensors and switch are applied directly or indirectly to an electronic engine controller 182 and the electronic transmission controller 184. The two controllers 182, 184 are connected to each other by a communication interface, for applying the necessary signals to each other.

The transmission controller 184 is comprised of a so-called microcomputer incorporating a central processing unit (CPU), a read-only memory (ROM), a random-access memory (RAM) and an interface. The CPU processes the input signals according to various control programs stored in the ROM, while utilizing a temporary data storage function of the RAM, for controlling the automatic transmission 14 and the lock-up clutch 32 by controlling the first, second and third solenoid-operated valves S1, S2, S3 and the linear solenoid valve SLU.

For controlling the automatic transmission 14 so as to shift the transmission 14 to the appropriate operating position, a plurality of shift patterns are stored in the ROM, and one of the shift patterns which corresponds to the currently selected position of the transmission 14 is selected to determine the operating position (one of the four forward drive positions) to which the transmission 14 should be shifted down or up. For instance, each shift pattern consists of a shift-down boundary line and a shift-up boundary line which are relationships between the throttle valve opening TAP and the vehicle speed V. On the basis of the determined forward drive position to which the transmission 14 should be shifted, the solenoid-operated valves S1 and S2 are suitably controlled (with their solenoid coils being suitably energized or de-energized), so as to establish an appropriate combination of the operating states of the clutches and brakes C0, C1, C2, B0, B1, B2, B3, which combination corresponds to the determined forward drive position.

Figure 7:
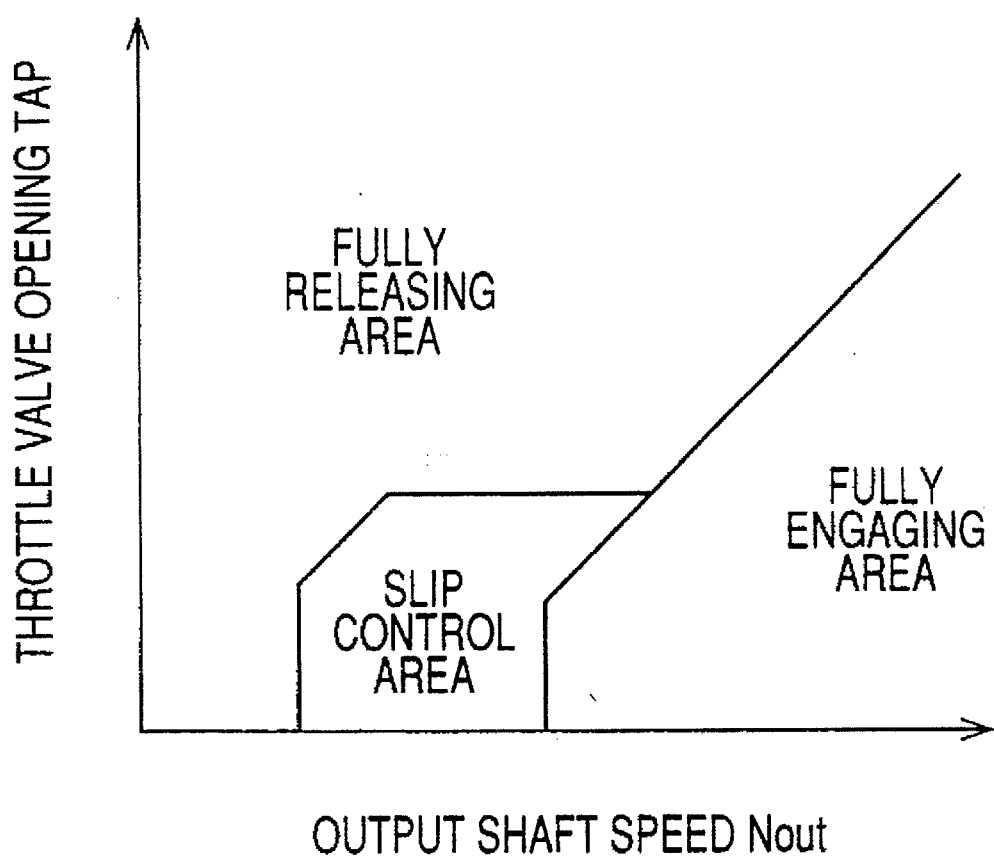
FIG. 7 is a view indicating boundaries defining different control areas of the lock-up clutch in relation to the running condition of the vehicle, which boundaries are stored in the slip control apparatus shown in FIG. 3.

The transmission controller 184 is adapted to control the lock-up clutch 32 in the manner explained below, when the vehicle is running with the transmission 14 placed in the third-speed or fourth-speed or overdrive position ("3rd" or "O/D"), for example. For controlling the lock-up clutch 32 differently depending upon the running condition of the vehicle, predetermined boundaries defining three different control areas as indicated in FIG. 7 are stored in the ROM. For instance, the boundaries are relationships between the throttle valve opening TAP and the output speed Nout of the output shaft 40 of the transmission 14 (vehicle speed V). Described more specifically, these boundaries define a fully releasing area in which the lock-up clutch 32 should be fully released, a fully engaging area in which the clutch 32 should be fully engaged, and a slip control area in which the amount of slip of the clutch 32 should be suitably controlled according to the principle of the present invention as described below in detail. Depending upon the currently detected throttle opening TAP and output speed Nout, one of the three control areas is determined or selected by the CPU of the transmission controller 184, according to the boundaries stored in the ROM.

When the vehicle running condition (TAP and Nout) is in the slip control area, the lock-up clutch 32 is controlled to be held in a partially slipping state for transmitting power of the engine 10 to the automatic transmission 14 so as to maximize the fuel economy of the vehicle while absorbing a torque variation of the engine 10 to assure high drivability of the vehicle. The determination as to whether the vehicle running condition falls in the slip control area according to the boundaries of FIG. 7 stored in the ROM is effected while the vehicle is accelerating. In this respect, it is noted that the amount of slip of the lock-up clutch 32 is also controlled while the vehicle is coasting or decelerating with the throttle valve 166 placed in the idling position. This slip control is effected to increase an effect of the fuel-cut control of the engine 10. In this case, however, the slip control area is determined on the basis of only the vehicle speed V, since the throttle opening TAP is zero during the coasting of the vehicle.

If the CPU of the controller 184 determines that the vehicle running cognition falls in the fully engaging area of FIG. 7, the solenoid coil of the third solenoid-operated valve S3 is energized to turn ON the lock-up relay valve 52, and the SLIP CONTROL current $I_{SLU}$ applied to the linear solenoid valve SLU is reduced to the minimum value, whereby the lock-up clutch 32 is fully engaged. If the vehicle running condition is determined to be in the fully releasing area, the solenoid coil of the valve S3 is de-energized to turn OFF the lock-up relay valve 52, so that the lock-up clutch 32 is fully released irrespective of the SLIP CONTROL current $I_{SLU}$. If the vehicle running condition is determined to be in the slip control area of FIG. 7, the solenoid coil of the valve S3 is energized to turn ON the lock-up relay valve 52, and the SLIP CONTROL current $I_{SLU}$ to be applied to the valve SLU, that is, the duty ratio $D_{SLU}$ of the valve SLU is adjusted according to the following equation (2) to control the amount of slip of the lock-up clutch 32 in a slip control mode:

$$D_{SLU}(=I_{SLU})=DFWD+KGD+DFB \qquad (2)$$

For instance, the duty ratio $D_{SLU}$ is calculated to zero an error $\Delta E$ $(=N_{SLP}-TN_{SLP})$ between a target slip speed $TN_{SLP}$ and the actual slip speed $N_{SLP}$ $(=N_E-N_T)$ of the lock-up clutch 32. The first term DFWD of the right member of the above equation (2) is a feed-forward control value which varies as a function of the output torque of the engine 10, for example. The second term KGD of the right member is a learning control value which is updated during slip control cycles, to compensate for a feedback deviation due to fluctuation of the operating characteristic of the lock-up clutch 32. The third term DFB is a feedback control value which is a sum of a proportional value, a differential value and an integral value of the error $\Delta E$, as indicated by the following equation (3):

$$DFB = K_P[\Delta E + (1/T1)\int \Delta E/dt + T_D(d\Delta E/dt)] \quad (3)$$

The electronic engine controller 182 is comprised of a microcomputer similar to that of the transmission controller 184, which has a CPU adapted to process the input signals according to programs stored in a ROM while utilizing a temporary data storage function of a RAM, for controlling the engine 10, more specifically, for effecting: a fuel injection control for controlling a fuel injection valve 186 so as to optimize the combustion condition of the engine 10; an ignition control for controlling an ignitor 188 so as to optimize the ignition timing; a traction control for controlling a second throttle valve 192 via a throttle actuator 190 so as to control the traction force of the vehicle while preventing slipping of the drive wheels on the road surface; and a fuel-cut control for holding the fuel injection valve 186 closed while the engine speed $N_E$ is higher than a predetermined fuel-cut threshold level $N_{CUT}$ during deceleration or coasting of the vehicle, so that the fuel economy of the vehicle is improved. However, the fuel-cut control is not initiated even if the vehicle deceleration is detected, unless predetermined conditions are satisfied. These conditions include a condition that the temperature $T_{HW}$ of the engine coolant (detected by the coolant temperature sensor 170) is higher than a predetermined lower limit, and a condition that the automatic transmission 14 is not in the process of a shifting action. It will be understood that the fuel injection valve 186 and a portion of the engine controller 182 assigned to execute the fuel-cut control constitute a fuel-cut device 198 which will be described.

Referring next to the block diagram of FIG. 8, there will be described the functions of various functional means provided in the electronic transmission controller 184 used in the present first embodiment of the invention. That is, the transmission controller 184 incorporates slip control means 186, fuel-cut device 198, deceleration monitoring means 200, timing control means 202, gradual fuel-cut commanding means 208, fuel-cut monitoring means 210, and slip control output changing means 212.

If a decelerating state following an accelerating state of the vehicle is detected by the deceleration monitoring means 200, the timing control means 202 commands the slip control means 196 to initiate a slip control operation of the lock-up clutch 32. That is, the SLIP CONTROL CURRENT $I_{SLU}$ corresponding to the calculated duty ratio $D_{SLU}$ is applied to the linear solenoid valve SLU through the timing control means 212, so that the actual slip speed $N_{SLP}$ (=$N_E$–$N_T$) of the lock-up clutch 32 coincides with the target slip speed $TN_{SLP}$ (e.g., several tens of rotations per minute). However, the output of the slip control means 196 is changed by the slip control output changing means 212, as described below in detail, until the fuel-cut device 198 is operated. The timing control means 202 commands the fuel-cut device 198 to delay the initiation of a fuel-cut operation for a predetermined length of time, in order to reduce the amount of reduction of the engine speed $N_E$ in an initial period of the slip control operation of the slip control means 196.

The timing control means 202 includes time measuring means 204 for measuring a predetermined delay time $T_D$ after the deceleration monitoring means 200 has detected a decelerating state of the vehicle, and delay-time setting means 206 for determining the delay time $T_D$ depending upon whether an air conditioner provided on the vehicle is operating or not. If the air conditioner is not operating, the delay-time setting means 206 sets the delay time $T_D$ to be relatively short (first time value). If the air conditioner is operating, the delay-time setting means 206 sets the delay time $T_D$ to be relatively long (second time value larger than the first time value). The timing control means 202 inhibits the fuel-cut device 198 from operating to cut the fuel supply to the engine 10P, for the delay time $T_D$ set by the delay-time setting means 206, namely, inhibits the operation of the fuel-cut device 198 until the time measured by the measuring means 204 coincides with the preset delay time $T_D$. The timing control means 202 further includes gradual fuel-cut commanding means 208 which is operated when the predetermined delay time has passed. This gradual fuel-cut commanding means 208 commands the fuel-cut device 198 to gradually or slowly cut the fuel supply to the engine 10 such that the fuel cut is effected sequentially with respect to the individual cylinders of the engine 10, so as to prevent a sudden decrease of the output torque of the engine 10, which would occur if the fuel cut is effected simultaneously for all the cylinders.

The fuel-cut monitoring means 210 is adapted determine whether the fuel-cut device 198 is in operation. The slip control output changing means 212 is adapted to change or restrict the feedback control value DFB in the above equation (2), to thereby change the slip control output (current $I_{SLU}$) of the slip control means 196, if the fuel-cut monitoring means 210 determines that the fuel-cut device 198 is not in operation. This "restriction" of the feedback control value DFB means not only the zeroing of the feedback control value DFB but also the reduction of this value DFB as calculated according to the above equation (3). In the present first embodiment, the feedback control value DFB is zeroed, and the slip control output $D_{SLU}$ (=$I_{SLU}$) is calculated according to the following equation (4):

$$D_{SLU} = DFWD + KGD \quad (4)$$

The slip control output changing means 212 includes gradual changing means 214 for gradually increasing or incrementing the feedback control value DFB after the operation of the fuel-cut device 198 is initiated. The feedback control value DFB is incremented to the value as calculated according to the above equation (3).

Referring to the flow charts of FIGS. 9 and 10, there will be described a timing control routine executed by the transmission controller 184 when the slip control operation and the fuel-cut operation are simultaneously effected by the slip control means 196 and the fuel-cut device 198, respectively, and a slip control output changing routine also executed by the transmission controller 184 to change the output of the slip control means 196 in relation to the fuel-cut operation.

Figure 9:
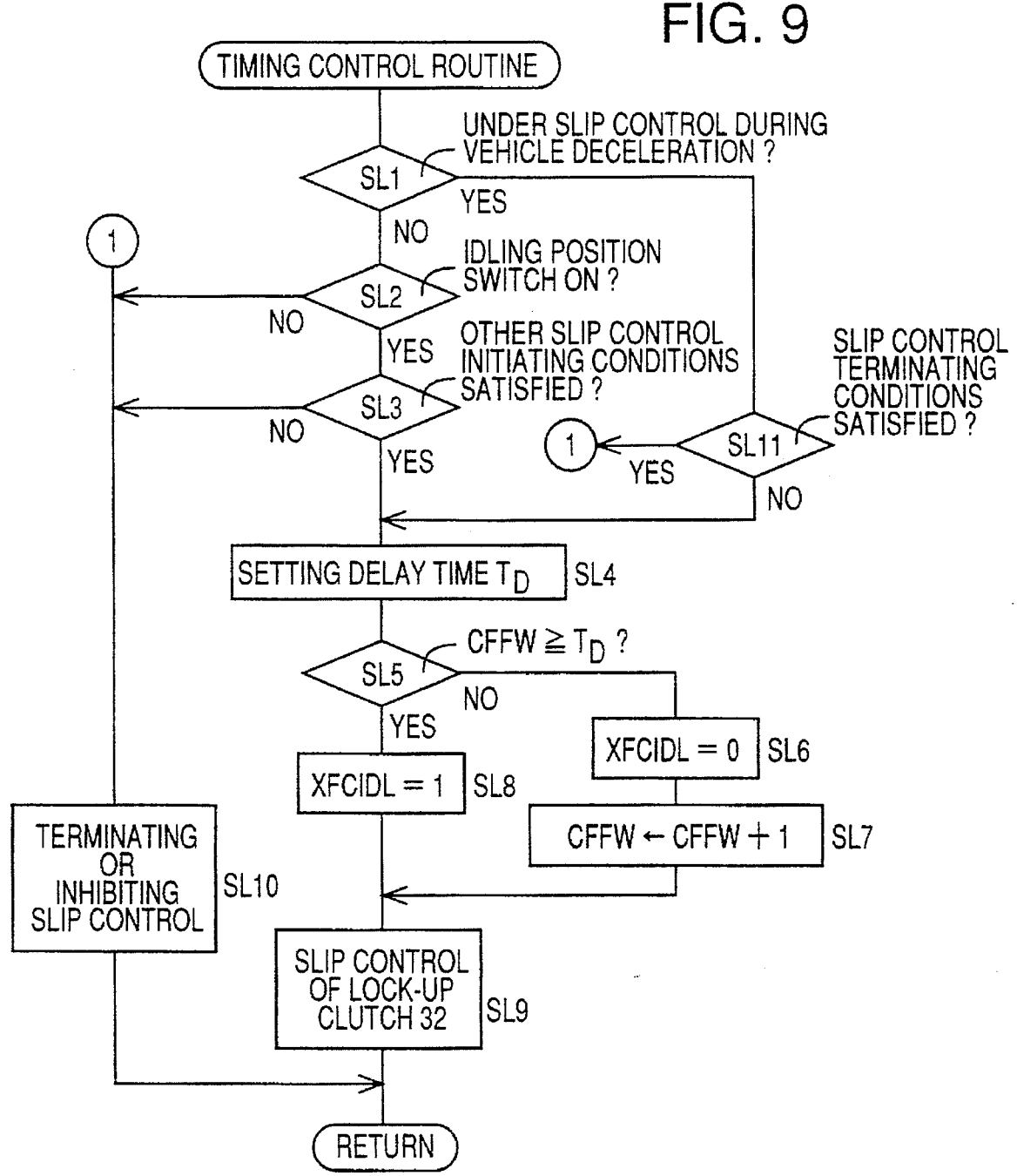
FIG. 9 is a flow chart schematically illustrating a timing control routine executed by the transmission controller to control a slip control operation of the lock-up clutch when the slip control operation is effected simultaneously with a fuel-cut operation.

The timing control routine of FIG. 9 is initiated with step SL1 to determine whether the slip control means 196 is in operation to control the lock-up clutch 32 in the slip control mode during vehicle deceleration. Immediately after the vehicle is started, a negative decision (NO) is obtained in step SL1, and the control flow goes to step SL2 corresponding to the deceleration monitoring means 200, to determine whether the idling position switch of the throttle sensor 167 is in the ON position. When the accelerator pedal 165 is depressed, a negative decision (NO) is obtained in step SL2, and the control flow goes to step SL10 to inhibit the slip control operation of the lock-up clutch 32 by the slip control means 196.

When the vehicle is brought into a decelerating state with the accelerator pedal 165 being returned to the non-operated or fully released position, an affirmative decision (YES) is obtained in step SL2, and step SL3 is implemented to determine whether the other conditions (other than the On state of the idling position switch) for initiating the slip control of the lock-up clutch 32 have been satisfied. These other conditions include, for example, a condition that the speed $N_T$ of the turbine impeller 22 is in a predetermined range. If a negative decision (NO) is obtained in step SL3, the control flow goes to step SL10 to inhibit the slip control operation of the slip control means 196. If an affirmative decision (YES) is obtained in step SL3, steps SL4–SL9 corresponding to the timing control means 202 are implemented. That is, step SL4 corresponding to the delay-time setting means 206 is implemented to set the delay time $T_D$ indicated above. The delay time $T_D$ is a time by which the initiation of the fuel-cut operation by the fuel-cut device 198 is delayed, which time corresponds to a time period during which an inertia torque is generated due to a change in the engine speed $N_E$ as a result of transition of the vehicle running state from acceleration to deceleration. For example, the delay time $T_D$ is set to 200 ms (first time value) if the air conditioner is not in operation, and to 500 ms (second time value) if the air condition is in operation.

Step SL4 is followed by step SL5 to determine whether the content of a time counter CFFW has reached a value corresponding to the delay time $T_D$. If a negative decision (NO) is obtained in step SL5, the control flow goes to step SL6 to reset a FUEL CUT flag XFCIDL to "0", and then to step SL7 corresponding to the time measuring means 204, to increment the content of the time counter CFFW. When the FUEL CUT flag XFCIDL is set at "1", the timing control means 202 commands the fuel-cut device 198 to initiate its operation to cut the fuel supply to the engine 10. The time counter CFFW is reset to "0" before the routine of FIG. 9 initiated.

Step SL7 is followed by step SL9 corresponding to the slip control means 196, to initiate the slip control of the lock-up clutch 32 by turning ON the lock-up relay valve 52 and by controlling the SLIP CONTROL pilot pressure $P_{SLU}$ according to the duty ratio $D_{SLU}$ of the linear solenoid valve SLU calculated according to the predetermined equation, such that the control error ΔE is zeroed. At this point of time indicated at t1 in FIG. 11, however, the fuel-cut operation by the fuel-cut device 198 has not been initiated, and the duty ratio $D_{SLU}$ is determined with the feedback control value DFB being zeroed in step SM3 of the slip control output changing routine of FIG. 10. In other words, the duty ratio $D_{SLU}$ is calculated according to the above equation (4) which does not include the third term DFB.

In the next cycle of execution of the routine of FIG. 9, an affirmative decision (YES) is obtained in step SL1, and the control flow goes to step SL11 to determine whether predetermined slip control terminating conditions have been satisfied. If an affirmative decision (YES) is obtained in step SL11, step SL10 is implemented to terminate the slip control operation of the lock-up clutch 32. If a negative decision (NO) is obtained in step SL11, the control flow goes to steps SL4–SL7 and SL9.

Figure 12:
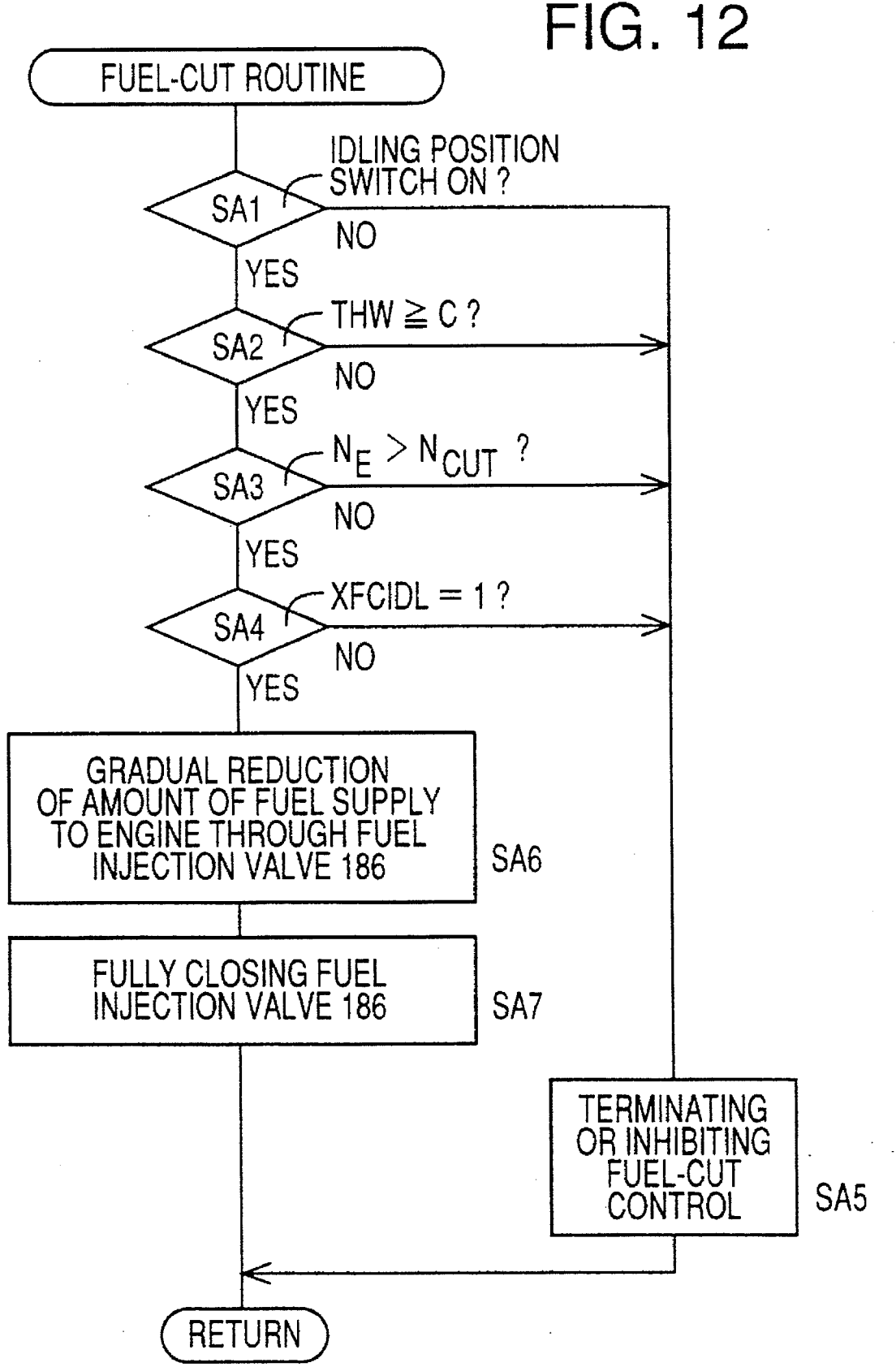
FIG. 12 is a flow chart illustrating a fuel-cut routine executed by the transmission controller.

During repeated implementation of steps SL1, SL11, SL4–SL7 and SL9, the content of the time counter CFFW has reached the value corresponding to the delay time $T_D$, and an affirmative decision (YES) is obtained in step SL5. As a result, step SL8 is implemented to set the FUEL CUT flag XFCIDL to "1", whereby the fuel-cut device 198 is commanded to initiate an operation to cut the fuel supply to the engine 10. An example of the fuel-cut routine is illustrated in the flow chart of FIG. 12 executed by the electronic engine controller 182. The fuel-cut routine is initiated with step SA1 to determine whether the idling position switch of the throttle sensor 167 is in the ON position. Step SA2 is provided to determine whether the temperature $T_{HW}$ of the engine coolant water detected by the sensor 170 is equal to or higher than a predetermined value C. Step SA3 is provided to determine whether the engine speed $N_E$ is higher than a predetermined fuel-cut speed $N_{CUT}$. If an affirmative decision (YES) is obtained in all of the above-indicated steps SA1–SA3, then step SA4 is implemented to determine whether the content of the FUEL CUT flag XFCIDL is set at "1". if a negative decision (NO) is obtained in any one of the above-indicated steps SA1–SA4, the control flow goes to step SA5 to inhibit or terminate the fuel-cut operation by the fuel-cut device 198.

If an affirmative decision (YES) is obtained in step SA4, the control flow goes to step SA6 corresponding to the gradual fuel-cut commanding means 208, in which the amount of fuel supply to the engine 10 through the fuel injection valve 186 is gradually reduced. Then, step SA7 is implemented to fully close the fuel injection valve 186 to completely cut the fuel supply to the engine 10, as indicated at t2 in the time chart of FIG. 11.

During the slip control of the lock-up clutch 32 with the vehicle in a decelerating state, the feedback control value DFB in the equation (2) to calculate the duty ratio $D_{SLU}$ is held zeroed until the fuel-cut operation is initiated. In other words, the above equation (4) is used until the fuel-cut device 198 is operated, as described above. After the fuel-cut operation is initiated, the feedback control value DFB is gradually increased, as illustrated in the flow chart of FIG. 10. The fuel-cut operation is not initiated if the engine coolant temperature $T_{HW}$ is lower than the predetermined level C, or if the automatic transmission 14 is in a shifting action, or the initiation of the fuel-cut operation is delayed for the predetermined delay time $T_D$ (i.e., the fuel-cut operation is inhibited until the FUEL CUT flag CFFW is set to "1"). When the fuel-cut operation is initiated during the slip control of the clutch 32, the slip control output $D_{SLU}$ is calculated according to the above equation (2) in step SM5 of the routine of FIG. 10.

Figure 10:
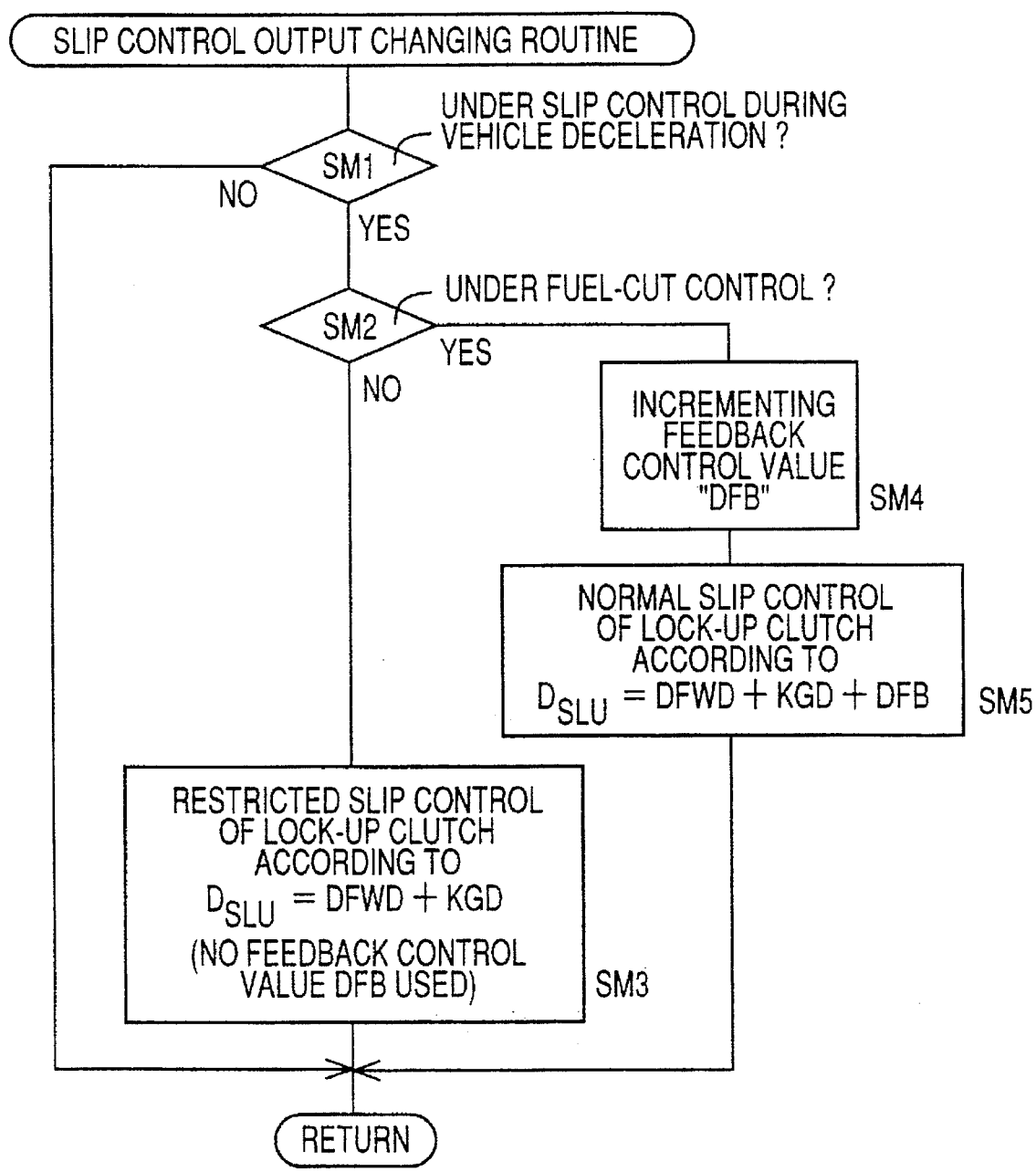
FIG. 10 is a flow chart illustrating a slip control output changing routine executed by the transmission controller to change the slip control output in relation to the fuel-cut operation.

The slip control output changing routine of FIG. 10 is initiated with step SM1 to determine whether the slip control means 196 is in operation during vehicle deceleration. If a negative decision (NO) is obtained in step SM1, the routine is terminated. If an affirmative decision (YES) is obtained in step SM1, the control flow goes to step SM2 corresponding to the fuel-cut monitoring means 210, to determine whether the fuel-cut device 198 is in operation. This determination may be effected on the basis of a signal applied from the engine controller 182 to the fuel injection valve 186.

If a negative decision (NO) is obtained in step SM2, that is, if the fuel-cut operation has not been initiated during the slip control of the lock-up clutch 32, step SM3 is implemented to calculate the slip control output $D_{SLU}$ according to the above equation (4).

Figure 11:
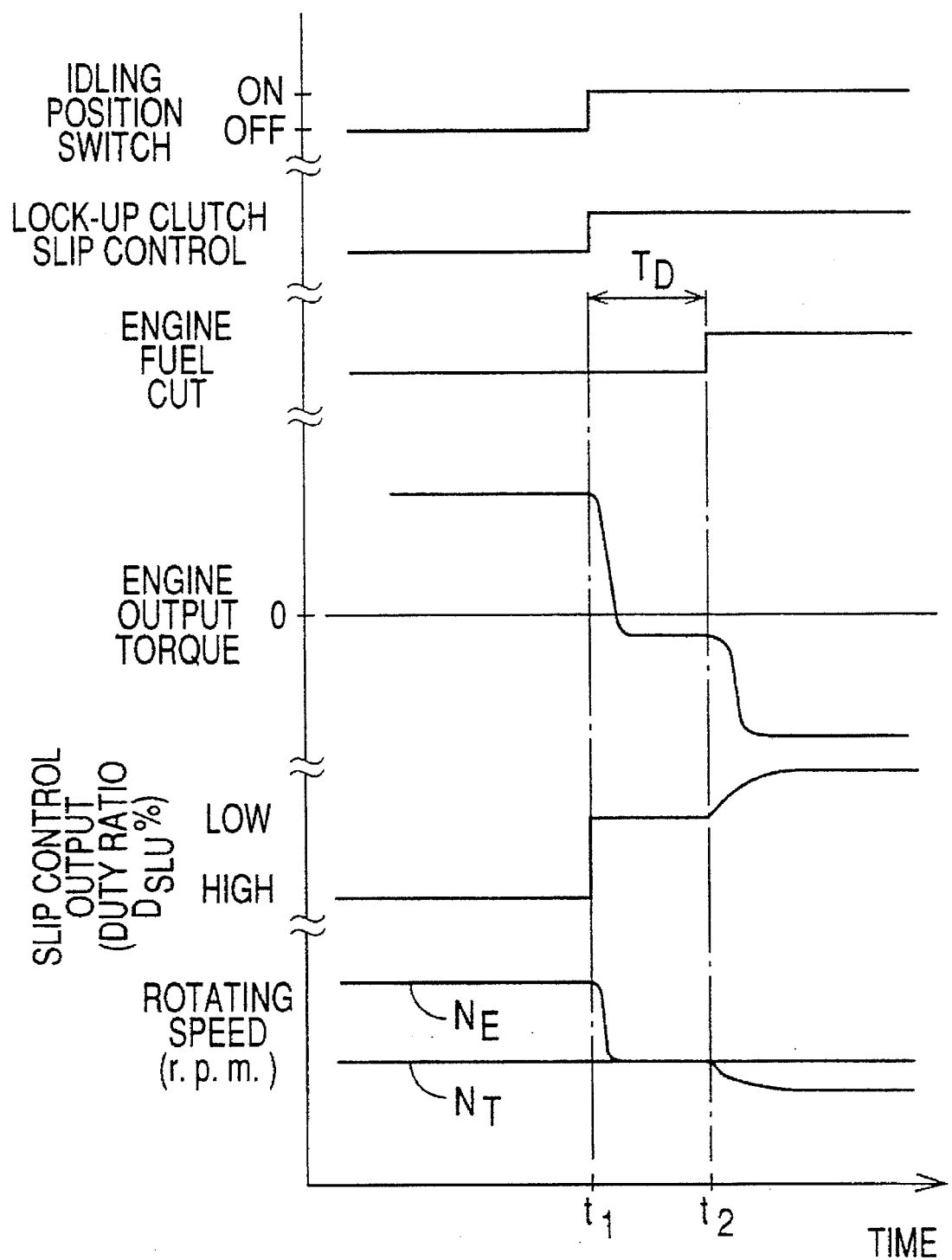
FIG. 11 is a time chart for explaining the timing control routine of FIG. 9.
Figure 13:
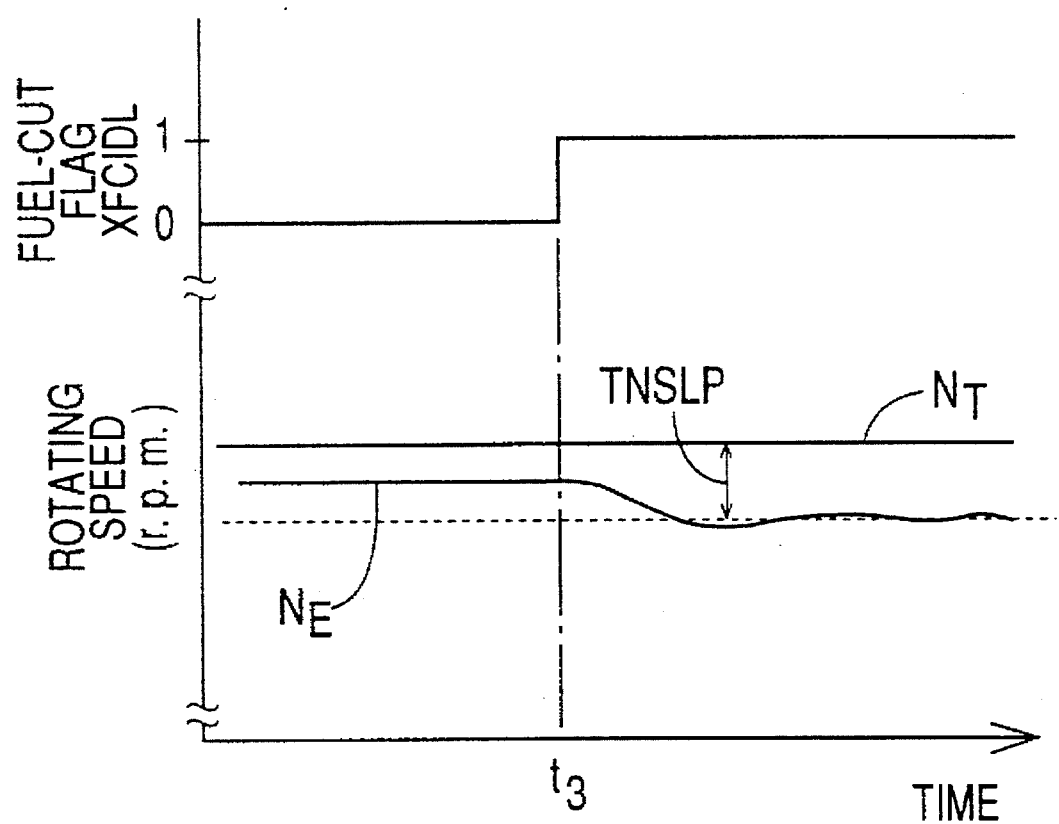
FIG. 13 is a time chart for explaining the slip control output changing routine of FIG. 10.

An affirmative decision (YES) is obtained in step SM2 when the fuel-cut operation is initiated as a result of a rise of the coolant water temperature $T_{HW}$, or upon completion of a shifting action of the transmission 14, or upon changing of the FUEL CUT flag XFCIDL to "1" as indicated at t3 in FIG. 13 (upon expiration of the delay time $T_D$ as indicated at t2 in FIG. 11). In this case, the control flow goes to step SM4 corresponding to the gradual changing means 214, to increment the feedback control value DFB from zero. Step SM4 is followed by step SM5 in which the slip control output $D_{SLU}$ is calculated according to the above equation (2). In step SM5, the feedback control value DFB incremented in step SM4 is used in the equation (2). With step SM4 repeatedly implemented, the feedback control value DFB used in step SM5 is increased up to the value as calculated according to the above equation (3).

Figure 8:
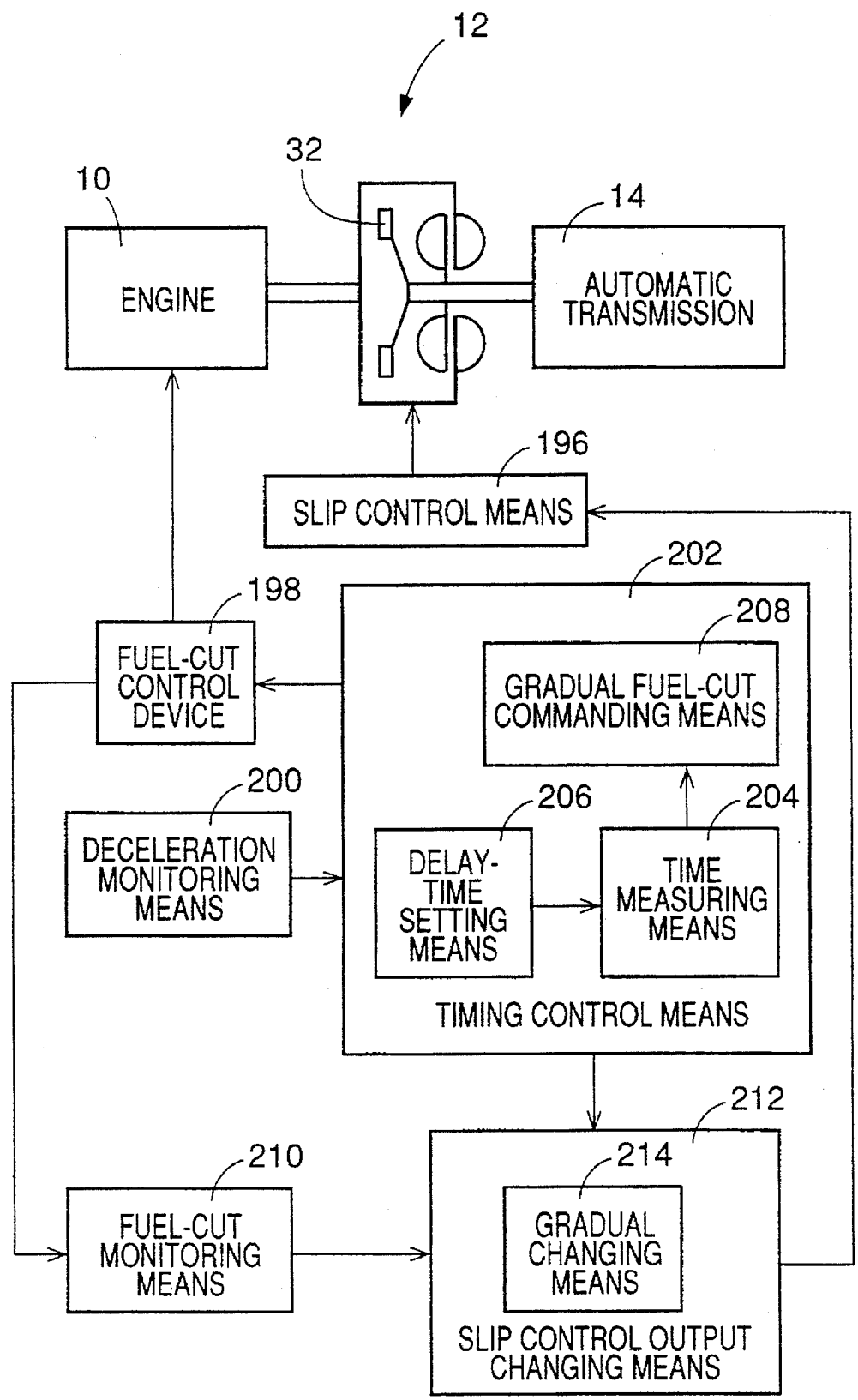
FIG. 8 is a schematic block diagram illustrating various functional means incorporated in the slip control apparatus used in the first embodiment.

In the present first embodiment schematically illustrated in FIG. 8, upon detection of a decelerating state of the vehicle by the deceleration monitoring means 200 in step SL2, the timing control means 202 commands the slip control means 196 through the slip control output changing means 212 to initiate the slip control of the lock-up clutch 32 in step SL9. Therefore, the amount or rate of change of the engine speed $N_E$ in the initial period of the slip control operation is considerably reduced. Further, the timing control means 202 delays the initiation of the fuel-cut operation by the fuel-cut device 198 for the predetermined delay time $T_D$ after the initiation of the slip control of the lock-up clutch 32, by repeated implementation of steps SL4-SL7 until the FUEL CUT flag XFCIDL is set to "1" in step SL8. During this delay time $T_D$, the engine output torque is reduced to a negative value close to zero, but the amount of change of the torque is relatively small and the torque is maintained to be almost zero after it is once reduced, as indicated in the graph of FIG. 11. Consequently, the slip control of the lock-up clutch 32 can be started without increasing the hydraulic pressure to increase the friction force or engagement force of the clutch 32. Generally, it is difficult to initiate the slip control of the clutch 32 when the clutch is subjected to a large negative torque. An increase in the hydraulic pressure to initiate the slip control in this condition will give an extremely large shock to the lock-up clutch 32. In the present embodiment, the slip control of the clutch 32 can be smoothly initiated without a shock, since the negative torque of the clutch is almost zero upon initiation of the slip control (as indicated in FIG. 11), and the hydraulic pressure for the clutch 32 need not be increased to initiate the slip control.

Figure 14:
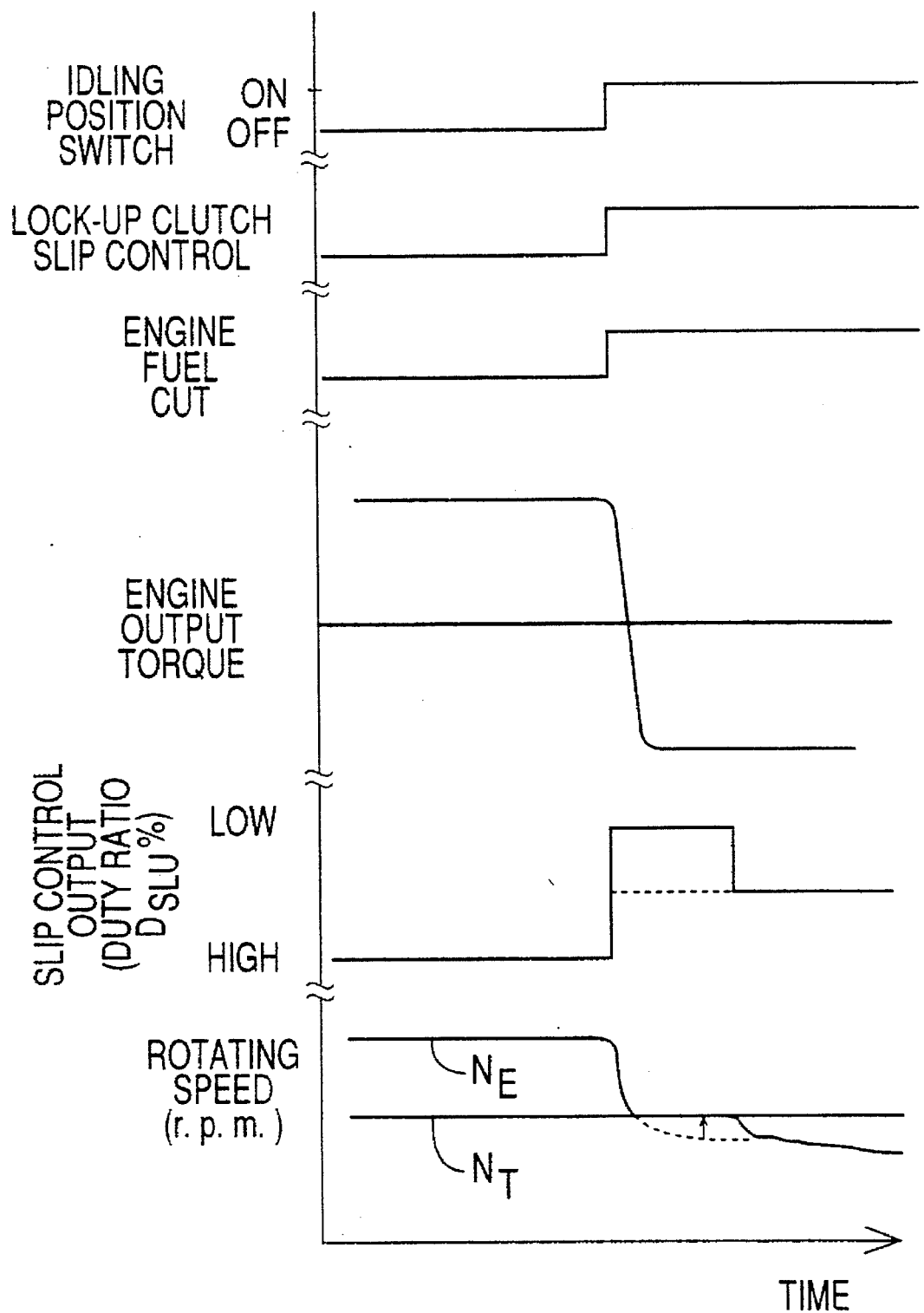
FIG. 14 is a time chart for explaining an operation in the conventional slip control apparatus wherein the fuel-cut operation is not delayed.

In the conventional control apparatus adapted to initiate the fuel-cut operation simultaneously with the slip control of the lock-up clutch, the output torque of the engine abruptly drops down to a large negative value, as indicated in the time chart of FIG. 14. In view of this phenomenon, the duty ratio $D_{SLU}$ is temporarily changed to increase the engagement force of the lock-up clutch. In the graph of FIG. 14, dashed line indicates a decrease of the engine speed $N_E$ which would occur if the duty ratio $D_{SLU}$ were not changed to increase the engagement force of the lock-up clutch.

The delay time $T_D$ is set in step SL4 by the delay-time setting means 206 of the timing control means 202, such that the delay time $T_D$ is longer when the air conditioner is in operation than when the air conditioner is not in operation. The thus set time $T_D$ is measured in steps SL5 and SL7 by the time measuring means 204 of the timing control means 202. The time measuring means 204 is started upon detection of the vehicle deceleration in step SL2 by the deceleration monitoring means 200. The timing control means 202 inhibits the initiation of the fuel-cut operation until the delay time $T_D$ has expired. The load acting on the engine 10 increases when the air conditioner is operated. The engine load also increases by operation of other devices driven by the engine 10, such as a power steering device, an alternator and a lighting system of the vehicle. The delay-time setting means 206 may be adapted to set the delay time $T_D$ depending upon the operation of these devices, too. In this respect, it is noted that the idling speed of the engine 100 is raised when the air conditioner or other engine-driven device is in operation. Therefore, the time before the rate of decrease of the engine speed $N_E$ has reduced to a low level is longer when the air conditioner or other engine-driven device is in operation. According to the present embodiment in which the delay time $T_D$ is determined depending upon the operation or non-operation of the air conditioner, the operation of the fuel-cut device 198 can always be initiated only after the rate of decrease of the engine speed has been lowered below a predetermined threshold, irrespective of whether the air conditioner is in operation or not. Accordingly, the lock-up clutch 32 can be adequately controlled in the slip control mode even in a period of the slip control immediately after the fuel-cut device 198 is activated.

Further, the gradual fuel-cut commanding means 208 of the timing control means 202 permits gradual change of the output torque of the engine immediately after the initiation of the fuel-cut operation by the fuel-cut device 198, which initiation is delayed by the time measuring means 204. Namely, the gradual fuel-cut commanding means 208 controls the fuel injection valve 198 in step SA6 such that the fuel cut does not occur simultaneously for all the cylinders of the engine 10, but the individual cylinders are sequentially subjected to the fuel cut one after another, to gradually cut the fuel supply to the engine 10. Accordingly, the slip control of the lock-up clutch 32 can be continued with high stability even after the fuel cut is initiated.

The present embodiment is further adapted such that the feedback control value DFB is zeroed in step SM3 by the slip control output changing means 212 if the fuel-cut monitoring means 210 determines in step SM2 that the fuel-cut device 198 is not in operation. Namely, the above equation (4) which does not include the feedback control value DFB is used to calculate the slip control output $D_{SLU}$ before the fuel-cut device 198 is operated. After the fuel-cut device 198 is operated, the slip control output $D_{SLU}$ is calculated in step SM5 according to the above equation (2) which includes the feedback control value DFB. This arrangement wherein the feedback control value DFB is restricted before the fuel-cut operation is effective to prevent otherwise possible deterioration of the slip control stability of the lock-up clutch 32 immediately after the initiation of the operation of the fuel-cut device 198.

Figure 15:
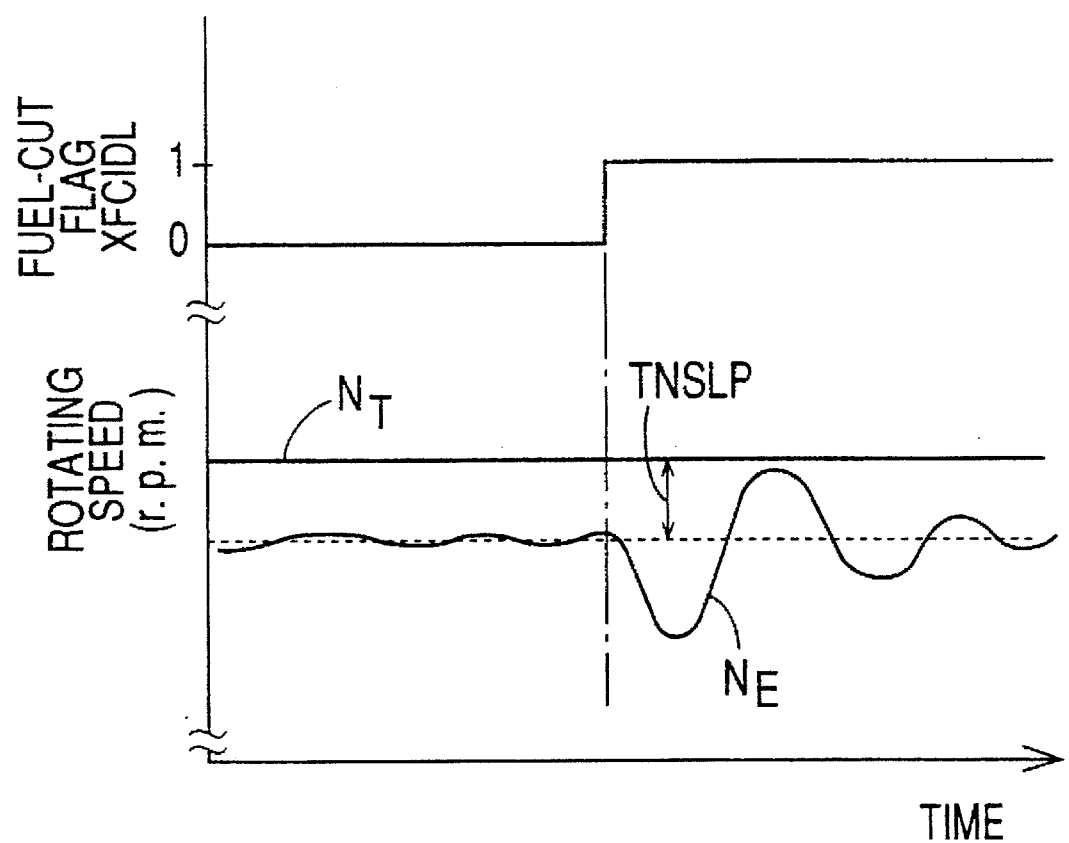
FIG. 15 is a time chart for explaining an operation in the conventional slip control apparatus wherein the feedback control value of the slip control output is not restricted during the fuel-cut operation.

The graph of FIG. 15 indicates a change of the engine speed $N_E$ according to the conventional slip control apparatus wherein the feedback control value DFB is not restricted before the fuel-cut device is operated. In this apparatus, the output torque of the engine suddenly drops to a considerable extent upon initiation of the fuel-cut operation, and the slip control of the lock-up clutch suffers from an undesirable hunting phenomenon of the engine speed $N_E$ as indicated in the graph.

Further, the slip control output changing means 212 has the gradual changing means 214 which is adapted to increment the feedback control value DFB used in the above equation (2) after the fuel-cut device 198 is operated, until the feedback control value DFB is increased to the value as normally calculated according to the above equation (3). Thus, the gradual changing means 214 permits gradual change of the feedback control value DFB from zero to the normally calculated value as the fuel-cut operation proceeds. This arrangement assures further improved stability of the slip control of the lock-up clutch 32 by the slip control means 196.

In the illustrated embodiment described above, the initiation of the fuel-cut operation by the fuel-cut device 198 is delayed until the content of the time counter CFFW has reached a value corresponding to the predetermined delay time $T_D$. However, the timing control means 202 may be adapted to delay the initiation of the fuel-cut operation until an affirmative decision is obtained by one of the following monitoring means: means for determining whether the rate of change of the engine speed $N_E$ has become smaller than a predetermined threshold; means for determining whether a difference (actual slip speed $N_{SLP}$) between the engine speed $N_E$ and the turbine impeller speed $N_T$ has been substantially zeroed; means for determining whether the rate of change of the output torque of the engine has been substantially zeroed; and means for determining whether the drop of the engine output torque after the idling position switch is turned ON has been completed. In this case, the fuel-cut device 198 is operated only after the lock-up clutch 32 has become ready to achieve fast slipping engagement so as to establish the comparatively low target slip speed $TN_{SLP}$.

While the gradual fuel-cut commanding means 208 (step SA6) and the gradual changing means 214 (SM4) are provided in the illustrated embodiment, these means 208, 214 or steps SA6, SM4 are not essential to practice the principle of the present invention.

Although the illustrated first embodiment uses the equation (2) which includes the feed-forward control value DFWD and the learning control value KGD, these parameters may be replaced by a predetermined constant or constants. Alternatively, the biasing force Fs of the spring 146 used in the lock-up clutch control valve 56 may be determined so as to give a predetermined influence on the pressure difference $\Delta P$, as if the SLIP CONTROL pressure $P_{SLU}$ in the above equation (1) were changed.

The delay-time setting means 206 may be adapted to determine the delay time $T_D$ as a function of the amount of increase in the idling engine speed $N_E$ which is caused by the operation of the air conditioner.

Figure 16:
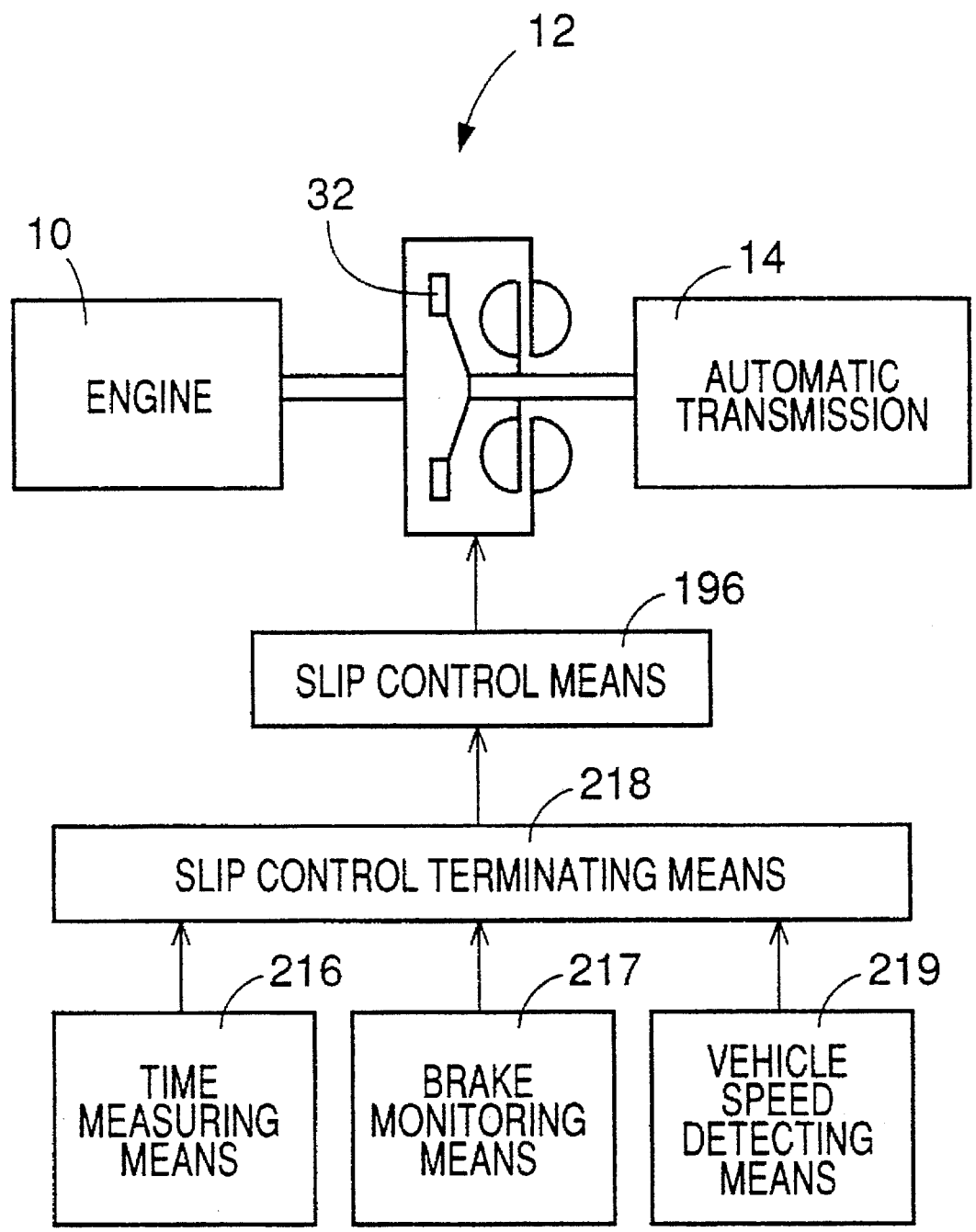
FIG. 16 is a schematic block diagram illustrating the functions of functional means provided in the slip control apparatus constructed according to a second embodiment of this invention.
Figure 17:
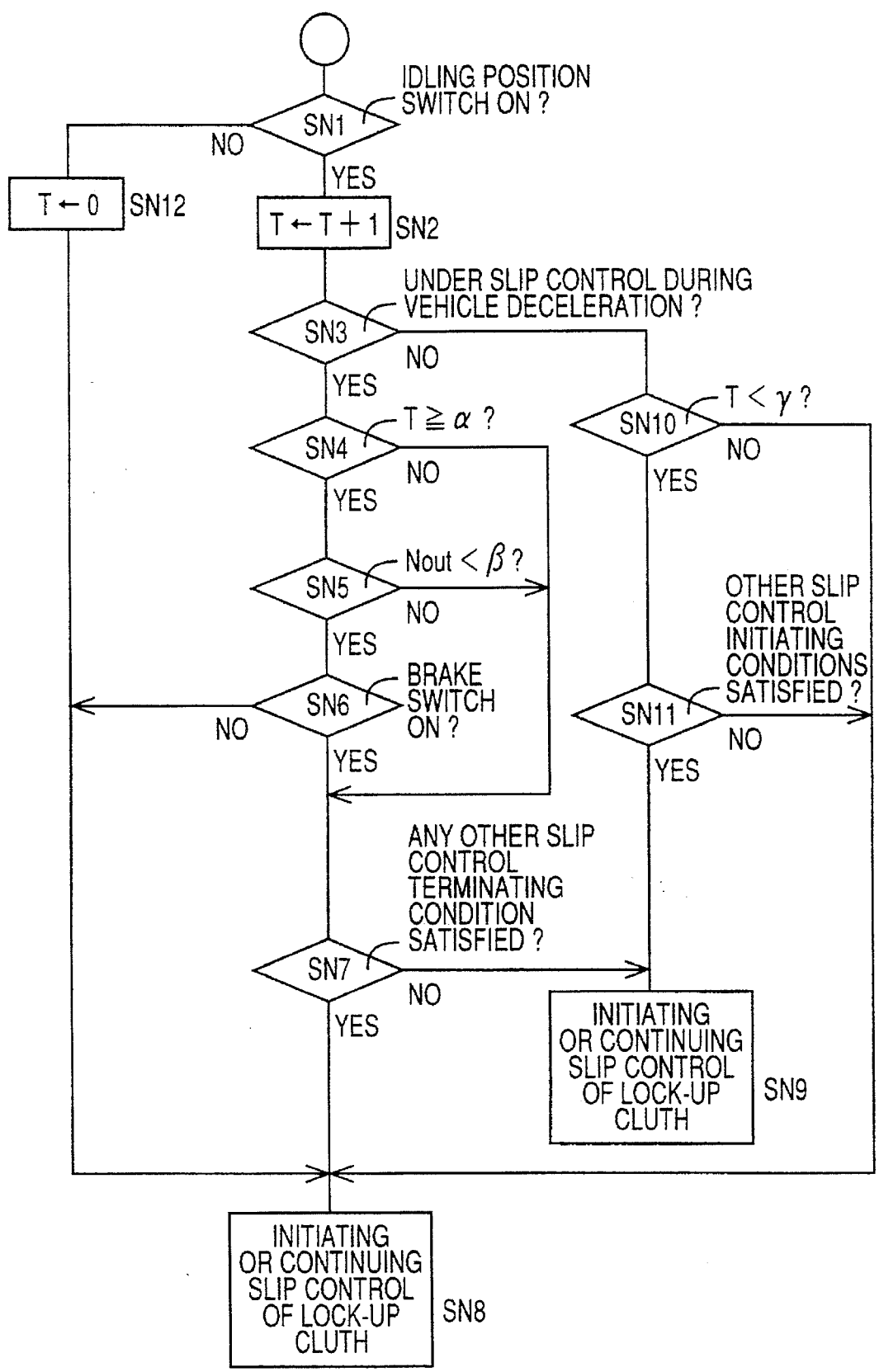
FIG. 17 is a flow chart illustrating a routine for controlling the lock-up clutch in the second embodiment.

Referring next to FIGS. 16-18, there will be described a slip control apparatus according to a second embodiment of this invention. This slip control apparatus includes the slip control means 196 described above, time measuring means 216, brake monitoring means 217 in the form of the brake switch 172, slip control terminating means 218, and vehicle speed detecting means 219 in the form of the vehicle speed sensor 168. The time measuring means 216 and the slip control terminating means 218 are incorporated in the transmission controller 184.

The time measuring means 216 is adapted to measure a predetermined time $\alpha$ which has passed after the idling position switch of the throttle sensor 167 is turned ON. The brake monitoring means 217 is adapted to determine whether a brake provided on the vehicle is activated, more specifically, whether the brake pedal is depressed. The vehicle speed detecting means 219 is adapted to detect the vehicle running speed V. The slip control terminating means 218 is adapted to command the slip control means 196 to terminate the slip control of the lock-up clutch 32 when the predetermined conditions are satisfied as described below in detail.

The slip control apparatus according to the present second embodiment of this invention is arranged to execute a routine of FIG. 17 at a suitable cycle time to control the lock-up clutch while the vehicle is in a decelerating state.

The routine of FIG. 17 is initiated with step SN1 to determine whether the idling position switch of the throttle sensor 167 is in the ON position. If a negative decision (NO) is obtained in step SN1, the control flow goes to step SN12 to reset a timer T to "0". The timer T is incorporated in the transmission controller 184. Step SN12 is followed by step SN8 to inhibit the slip control means 196 from operating to control the lock-up clutch 32 in the slip control mode, namely, to inhibit the slip control of the lock-up clutch 32. If an affirmative decision (YES) is obtained in step SN1, it means that the vehicle is in a decelerating state. In this case, the control flow goes to step SN2 to increment the timer T, and to step SN3 to determine whether the slip control means 196 is in operation during deceleration of the vehicle. If an affirmative decision (YES)) is obtained in step SN3, step SN4 is implemented to determine whether the time measured by the timer T has reached or exceeded the predetermined time $\alpha$.

It will be understood that steps SN2, SN4 and SN12 correspond to the time measuring means 216. If an affirmative decision (YES) is obtained in step SN4, the control flow goes to step SN5 to determine whether the speed Nout of the output shaft 40 of the automatic transmission 14 is lower than a predetermined threshold $\beta$. Since the speed Nout corresponds to the vehicle speed V, step SN5 corresponds to the vehicle speed detecting means 219. The threshold $\beta$ corresponds to a relatively low vehicle speed below which the degree of deceleration as felt by the vehicle driver is excessively large if the engine brake is applied to the vehicle by the slip control of the lock-up clutch 32 by the slip control means 196 together with the fuel cut of the engine 10.

If an affirmative decision (YES) is obtained in step SN5, the control flow goes to step SN6 to corresponding to the brake monitoring means 217, to determine whether the brake pedal has been depressed, that is, whether the brake switch 172 is in the ON position. If a negative decision (NO) is obtained in step SN6, it means that the vehicle speed V is lower than a predetermined threshold corresponding to the threshold $\beta$ and that the brake pedal has not been depressed within the predetermined time $\alpha$ after the idling position switch is turned on. In this case, step SN8 is implemented to command the slip control means 196 to terminate the slip control of the lock-up clutch 32. It will be understood that step SN8 corresponds to the slip control terminating means 218.

If an affirmative decision (YES) is obtained in step SN6, it means that the brake switch 172 has been turned ON and the brake pedal has been depressed within the predetermined time $\alpha$. In this case, step SN7 is implemented to determine whether any other condition for terminating the slip control of the lock-up clutch 32 is satisfied. If an affirmative decision (YES) is obtained in step SN7, the control flow goes to step SN8 to terminate the slip control of the lock-up clutch 32. The "any other condition for terminating the slip condition" means any slip control terminating condition other than the condition that the affirmative decision (YES) is obtained in steps SN4 and SN5 while the negative condition (NO) is obtained in step SN6. If a negative decision (NO) is obtained in step SN7, the control flow goes to step SN9 to continue the slip control of the lock-up clutch 32. If a negative decision (NO) is obtained in step SN4 or SN5, the control flow goes to step SN7, and the control goes to step SN8 or SN9 to terminate or continue the slip control depending upon whether any other slip control terminating condition is satisfied or not.

If a negative decision (NO) is obtained in step SN3, that is, if the slip control of the lock-up clutch 32 by the slip control means 196 has not been initiated after the idling position switch is turned on, step SN10 is implemented to determine whether the time measured by the timer T is shorter than a predetermined time $\gamma$. If an affirmative decision (YES) is obtained in step SN10, step SN11 is implemented to determine whether other conditions for initiating the slip control of the lock-up clutch 32 are satisfied. The "other conditions for initiating the slip control" means any slip control initiating condition other than the condition that the affirmative decision (YES) is obtained in step SN1. If an affirmative decision (YES) is obtained in step SN11, step SN9 is implemented to initiate the slip control of the lock-up clutch 32. If a negative decision (NO) is obtained in step SN11, step SN8 is implemented to inhibit the slip control.

If a negative decision (NO) is obtained in step SN10, namely, if the time measured by the timer T exceeds the predetermined time γ, step SN8 is implemented to inhibit the slip control of the lock-up clutch 32.

Figure 18A:
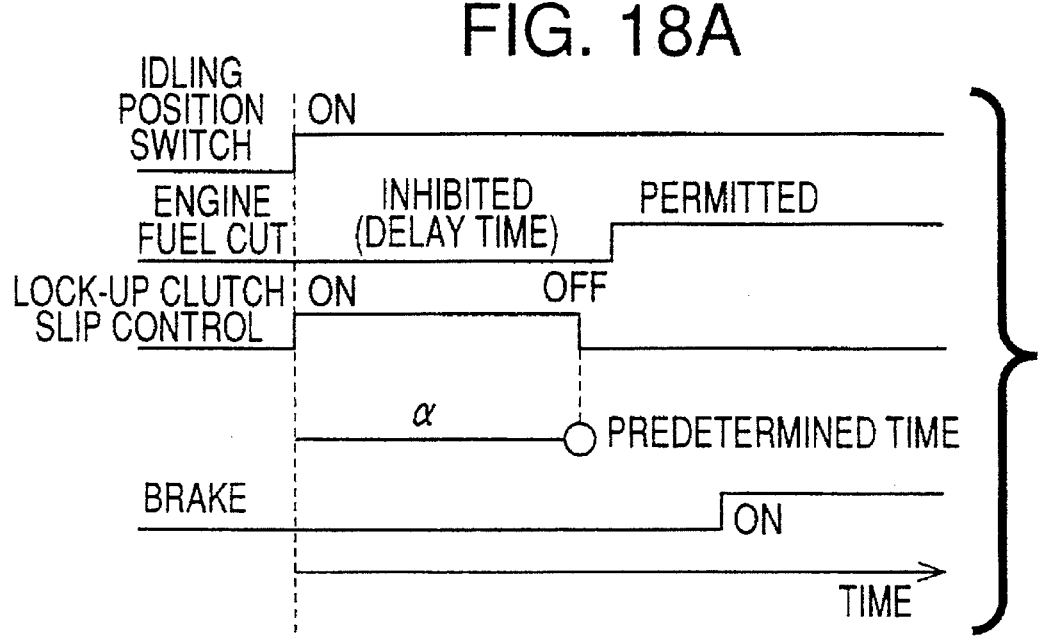
FIGS. 18A and 18B are time charts for explaining different slip control operations of the lock-up clutch in different vehicle running conditions, in the second embodiment.
Figure 18B:
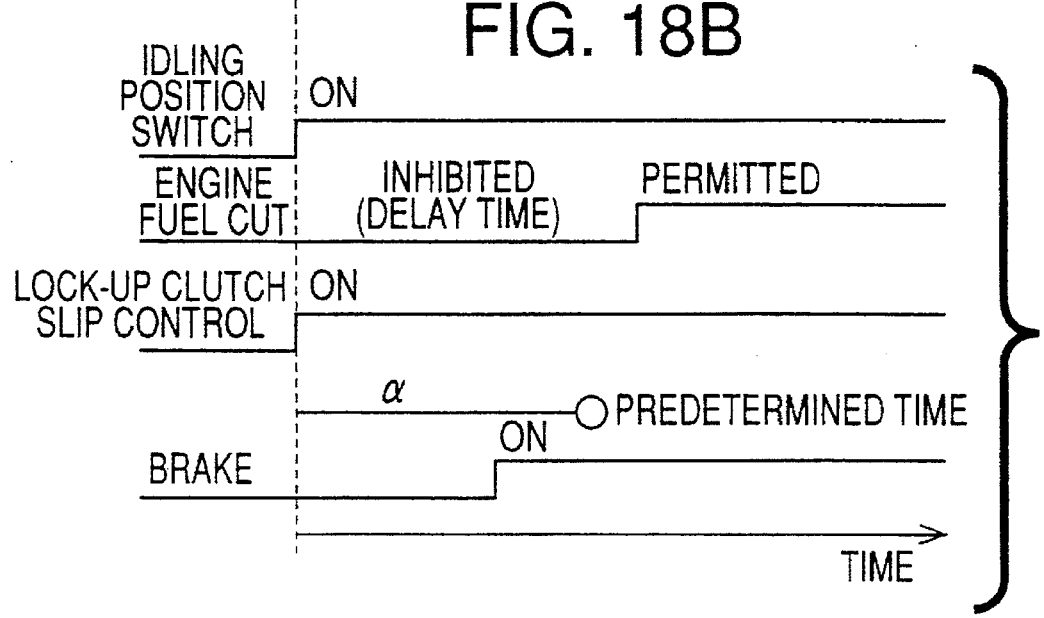

The significance of the slip control apparatus according to the present second embodiment of the invention will be described by reference to the time chart of FIGS. 18(A) and 18(B). In the case of FIG. 18(A), the brake pedal is not depressed within the predetermined time α after the idling position switch is turned ON, namely, after the accelerator pedal is released. In this case, the slip control terminating means 218 commands the slip control means 196 to terminate the slip control of the lock-up clutch 32 when the predetermined time α has passed. In other words, the lock-up clutch 32 is brought to the fully released position if the brake pedal is not depressed by the vehicle driver within the predetermined time α after the accelerator pedal is released. In the case of FIG. 18(B), on the other hand, the brake pedal is depressed before the predetermined time α has passed after the accelerator pedal is released to the engine idling position. In this case, the slip control of the lock-up clutch 32 which has been initiated when all the slip control initiating conditions were satisfied (when the affirmative decision was obtained in step SN11) is continued.

In the case of FIG. 18(A) wherein the brake pedal is not depressed within the predetermined time α, it is considered that the vehicle driver has released the accelerator pedal to run the vehicle in the coasting mode with the engine placed in the idling state, and has no intention to stop the vehicle. Since the slip control of the lock-up clutch 32 is terminated in this case, the negative torque transmitted from the drive wheels of the vehicle to the engine through the lock-up clutch is reduced, whereby the engine braking effect is reduced. Thus, the present arrangement is effective to prevent a driving discomfort which would be felt by the vehicle driver if the slip control of the lock-up clutch 32 were continued. In the case of FIG. 18(B) wherein the brake pedal is depressed within the predetermined time α, it is considered that the vehicle driver has released the accelerator pedal for the purpose of stopping the vehicle. In this case, the continuation of the slip control will not deteriorate the driving comfort as felt by the vehicle driver, since the braking effect produced by the depression of the brake pedal is dominant over the engine braking effect produced by the continued slip control of the lock-up clutch.

In the present embodiment, the slip control apparatus has delay means adapted to delay the initiation of the fuel-cut operation to cut the fuel supply to the engine 10, with respect to the initiation of the slip control of the lock-up clutch 32. Namely, the fuel cut of the engine 10 is initiated a predetermined time after the idling position switch is turned ON, as indicated in the time chart of FIGS. 18A and 18B. As is apparent from FIGS. 18A and 18B, 18(a) and 18(B). As is apparent from FIGS. 18(A) and 18(B), the delay time is longer than the predetermined time α. This delay is intended to prevent an excessive large degree of deceleration of the vehicle which would occur if the slip control of the lock-up clutch 32 and the fuel cut of the engine 10 are simultaneously initiated.

However, the present second embodiment may be modified such that the fuel cut of the engine 10 is initiated as soon as the slip control of the lock-up clutch 32 is initiated, that is, as soon as the idling position switch is turned ON. In this case, too, the slip control apparatus has the same advantage as described above with respect to the slip control terminating means 218 which terminates the slip control of the lock-up clutch 32 if the brake pedal is not depressed within the predetermined time α after the idling position switch is turned ON.

Figure 19:
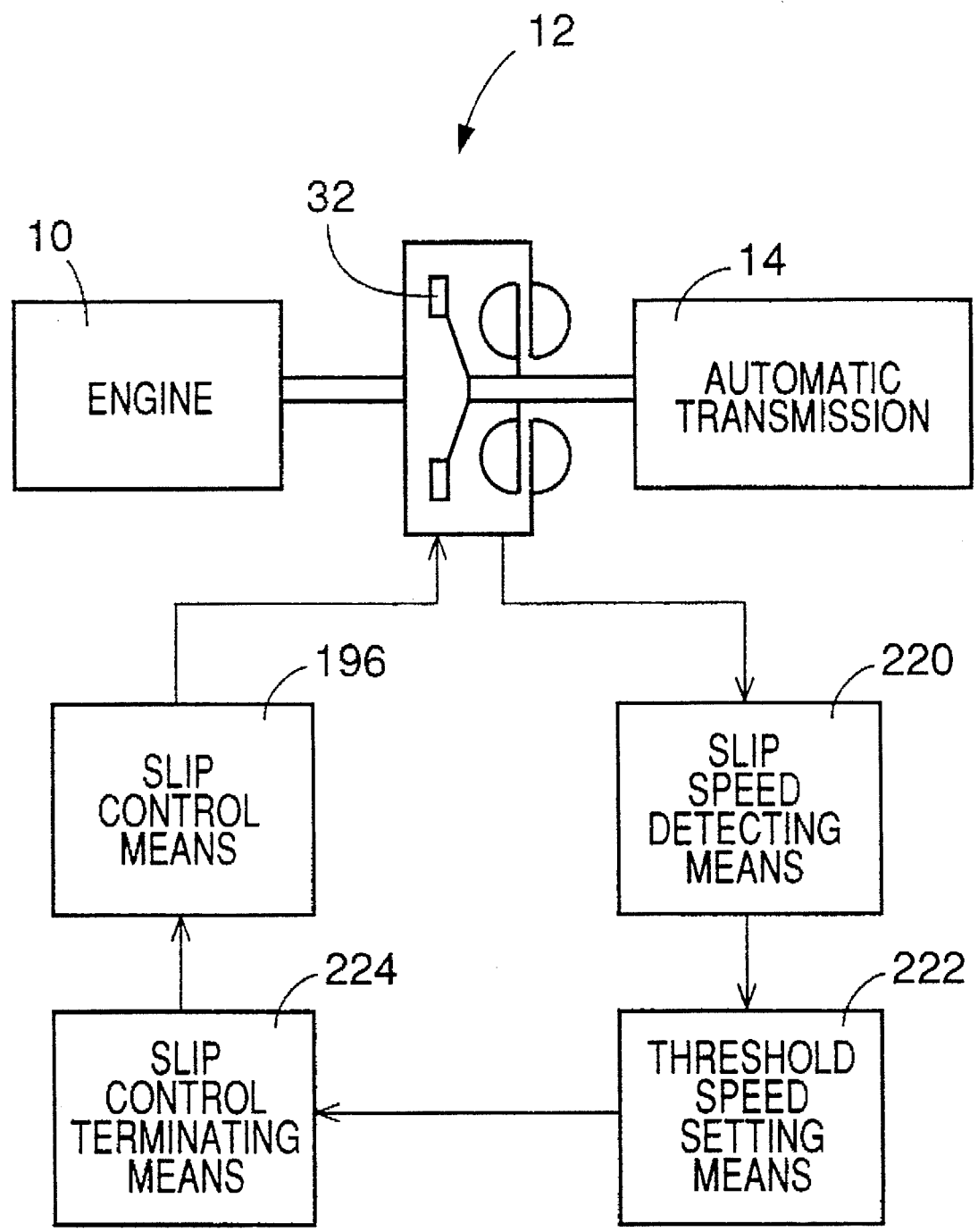
FIG. 19 is a schematic block diagram illustrating functional means provided in the slip control apparatus constructed according to a third embodiment of this invention.

A slip control apparatus according to a third embodiment of the present invention will be described by reference to FIGS. 19 and 20.

The slip control apparatus includes the slip control means 196 indicated above, slip speed detecting means 220, threshold speed setting means 222 and slip control terminating means 224. The slip speed detecting means 220 is adapted to detect the slip speed $N_{SLP}$ of the lock-up clutch 32, on the basis of the output signals of the engine speed sensor 160 and the turbine speed sensor 178. The slip speed $N_{SLP}$ is equal to $(N_E-N_T)=(N_P-N_T)$. It is noted that the speed $N_P$ of the pump impeller 18 is equal to the engine speed $N_E$. The threshold speed setting means 222 is adapted to determine a slip control terminating speed $N_{TEX}$, depending upon the detected slip speed $N_{SLP}$. The slip control terminating means 224 is adapted to command the slip control means 196 to terminate the slip control operation when the turbine impeller speed $N_T$ falls below the determined slip control terminating speed $N_{TEX}$.

Figure 20:
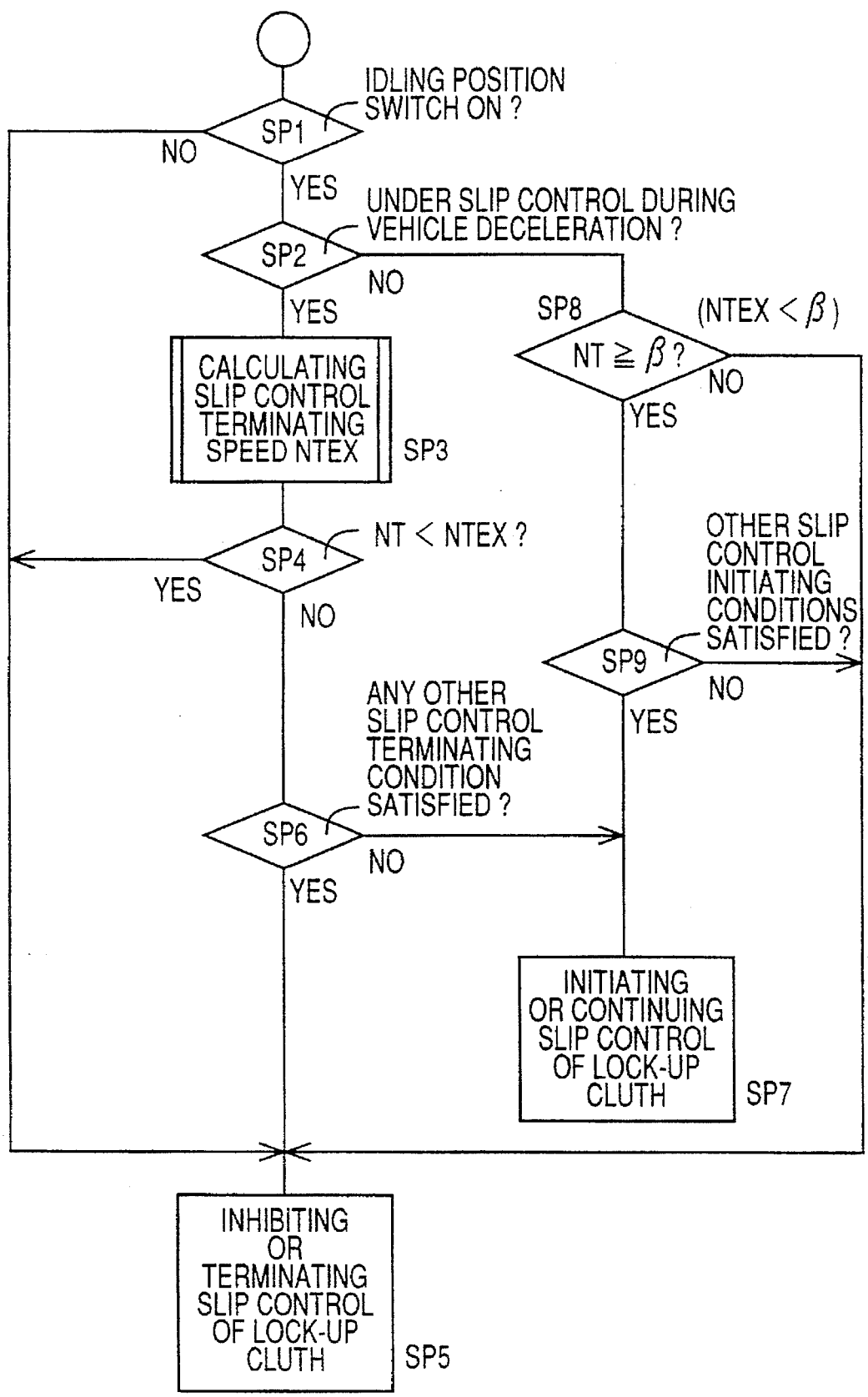
FIG. 20 is a flow chart illustrating a routine for controlling the lock-up clutch in the third embodiment.
Figure 21:
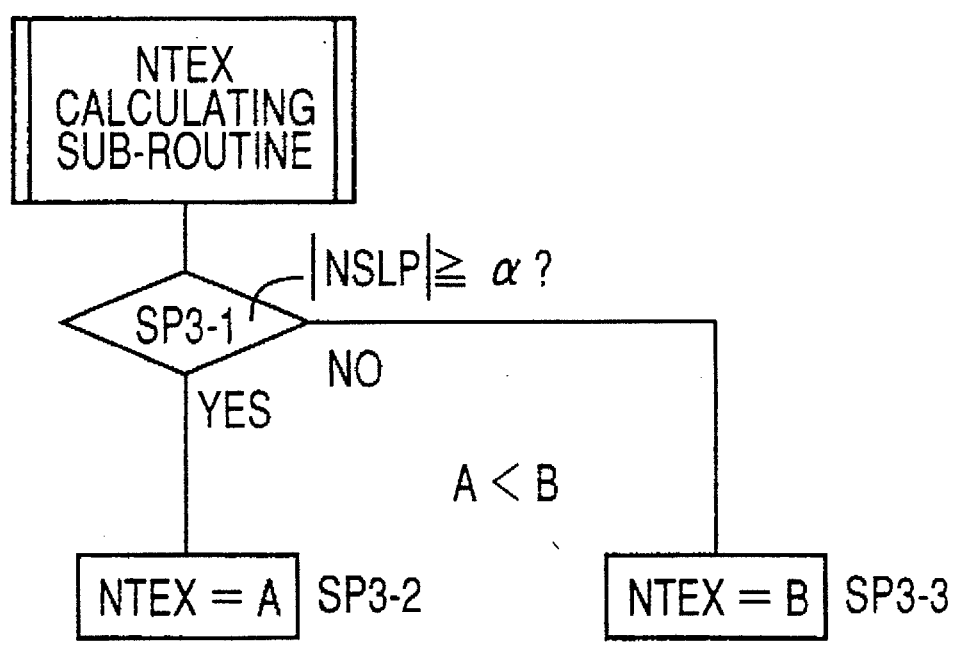
FIG. 21 is a flow chart illustrating a sub-routine for determining a fuel-cut terminating engine speed used in the routine of FIG. 20.

The flow chart of FIG. 20 illustrates a routine for controlling the lock-up clutch while the vehicle is in deceleration. The routine is initiated with step SP1 to determine whether the idling position switch of the throttle sensor 167 is in the ON position, namely, whether the accelerator pedal 165 is in the engine idling position (non-operated or fully released position). If a negative decision (NO) is obtained in step SP1, the control flow goes to step SP5 to inhibit the slip control of the lock-up clutch 32. If an affirmative decision (YES) is obtained in step SP1, the control flow goes to step SP2 to determine whether the slip control means 196 is in operation to control the amount of slip of the lock-up clutch 32 while the vehicle is in deceleration. If an affirmative decision (YES) is obtained in step SP2, step SP3 is implemented. This step SP3 is a sub-routine illustrated in the flow chart of FIG. 21, which corresponds to the threshold speed setting means 222. The sub-routine of FIG. 21 is initiated with step SP3-1 to determine whether the absolute value of the slip speed $N_{SLP}$ detected by the slip speed detecting means 220 is equal to or larger than a predetermined reference value α. While the vehicle is in deceleration with the accelerator pedal 165 placed in the engine idling position, the slip speed $N_{SLP}$ (=$N_P-N_T$) is generally negative. Therefore, the absolute value of the negative slip speed $N_{SLP}$ is compared with the reference value α, which is a value relatively close to zero. The absolute value of the slip speed $N_{SLP}$ means the amount of slip of the lock-up clutch 32, regardless of which one of the pump and turbine impeller speeds is higher than the other. If an affirmative decision (YES) is obtained in step SP3-1, it means that the absolute value of the slip speed $N_{SLP}$ is equal to or larger than the reference value α. In this case, step SP3-2 is implemented to set the slip control terminating speed $N_{TEX}$ to a first value "A". If a negative decision (NO) is obtained in step SP3-1, namely, if the absolute value of the slip speed $N_{SLP}$ is smaller than the reference value α, step SP3-3 is implemented to set the slip control terminating speed $N_{TEX}$ to a second value "B" which is higher than the first value "A".

Thus, the slip control terminating speed $N_{TEX}$ of the turbine impeller speed $N_T$ is determined to be higher when the absolute value of the slip speed $N_{SLP}$ is smaller than the reference value α, than when the absolute value is equal to or larger than the reference value α. In other words, the slip control terminating speed $N_{TEX}$ is determined to be relatively high (second value "B") when the amount of slip of the lock-up clutch 32 during vehicle deceleration is relatively small, and determined to be relatively low (first value "A") when the amount of slip of the clutch 32 is relatively large.

Upon completion of the sub-routine of FIG. 21, the control flow goes to step SP4. That is, step SP3 is followed by step SP4 to determine whether the actual speed $N_T$ of the turbine impeller 22 is lower than the determined slip control terminating speed $N_{TEX}$. If the turbine impeller speed $N_T$ is lower than the threshold speed $N_{TEX}$, step SP5 is implemented to terminate the slip control operation of the slip control means 196. In other words, the slip control terminating means 224 commands the slip control means 196 to terminate the slip control of the lock-up clutch 32 if the turbine impeller speed $N_T$ drops below the threshold value $N_{TEX}$. It will be understood that steps SP4 and SP5 correspond to the slip control terminating means 224.

If the turbine impeller speed $N_T$ is equal to or higher than the slip control terminating speed $N_{TEX}$, the slip control of the lock-up clutch 32 is continued unless any other condition for terminating the slip control is satisfied. That is, if the negative decision (NO) is obtained in step SP4, the control flow goes to step SP4 to determine whether any other slip control terminating condition (other than the affirmative decision in step SP4) is satisfied. If an affirmative decision (YES) is obtained in step SP6, step SP5 is implemented to terminate the slip control of the clutch 32, even if the negative decision (NO) is obtained in step SP4. If a negative decision (NO) is obtained in step SP6, that is, if none of the slip control terminating conditions are satisfied, the control flow goes to step SP7 to continue the slip control of the lock-up clutch 32.

If a negative decision (NO) is obtained in step SP2, it means that the slip control means 196 is not in operation. In this case, step SP8 is implemented to determine whether the turbine impeller speed $N_T$ is equal to or higher than a reference value β. This reference value β, which is referred to as "slip control initiating speed", is determined to be higher than the slip control terminating speed. If a negative decision (NO) is obtained in step SP8, step SP5 is implemented to inhibit the slip control of the lock-up clutch 32 by the slip control means 196. If an affirmative decision (YES) is obtained in step SP8, that is, if the turbine impeller speed $N_T$ is equal to or higher than the slip control initiating speed β, the control flow goes to step SP9 to determine whether the other conditions for initiating the slip control are satisfied. It will be understood that the affirmative decision (YES) in step SP8 is one of the slip control initiating conditions.

If an affirmative decision (YES) is obtained in step SP9, that is, all the slip control initiating conditions are satisfied, the control flow goes to step SP7 in which the slip control means 196 is commanded to initiate the slip control operation to control the amount of slip of the lock-up clutch 32. If any one of the other slip control initiating conditions is not satisfied, the control flow goes to step SP5 to inhibit the slip control of the clutch 32.

It will be understood that the present third embodiment is adapted to determine the slip control terminating speed $N_{TEX}$ depending upon the absolute value of the detected slip speed $N_{SLP}$, namely, depending upon the slip amount of the lock-up clutch 32 during the slip control while the vehicle is in a decelerating state. More specifically, the slip control terminating speed $N_{TEX}$ is determined to be relatively low (first value "A") when the amount of slip of the lock-up clutch 32 is relatively large, and is determined to be relatively high (second value "B") when the amount is slip of the clutch 32 is relatively small. The relatively small slip amount of the lock-up clutch 32 means a relatively large degree of engagement of the clutch 32, and a relatively large transmission torque of the clutch 32 (of the torque converter 12). For instance, when the slip amount ($|N_{SLP}|$ of the lock-up clutch 32 is substantially zero, the lock-up clutch 32 is substantially fully engaged. If the brake of the vehicle is activated by the vehicle driver while the vehicle is in deceleration with the lock-up clutch 32 being almost fully engaged, the negative torque transmitted from the vehicle drive wheels is substantially entirely transmitted to the engine 10 through the lock-up clutch 32, whereby the engine speed $N_E$ is lowered at a high rate as the vehicle speed is lowered by the brake application. If the lock-up clutch 32 is fully engaged for some reason or other during the slip control of the lock-up clutch 32 by the slip control means 196, the engine speed $N_E$ would be excessively lowered upon brake application and the engine 20 would tend to stall, if the slip control were continued. According to the present embodiment, the slip control of the lock-up clutch 32 is terminated (and the clutch 32 is fully released) when the turbine impeller speed $N_T$ (almost equal to the engine speed $N_E$ when the clutch 32 is almost fully engaged) is still relatively high, because the slip control terminating speed $N_{TEX}$ is set to be relatively high when the amount of slip (absolute value of the slip speed) of the clutch 32 is relatively small. Thus, the present arrangement is effective to prevent otherwise possible stalling of the engine 10 upon brake application to the vehicle during deceleration with the lock-up clutch 32 being controlled by the slip control means 196.

When the amount of slip of the lock-up clutch 32 is relatively large, the brake application to the vehicle will not cause a sudden drop of the engine speed $N_E$ because the clutch 32 is slipping in a considerable degree. In this case, the slip control operation is terminated only after the turbine speed $N_T$ has been lowered to the relatively low slip control terminating speed $N_{TEX}$.

While the third embodiment of FIGS. 20 and 21 is adapted to change the slip control terminating speed $N_{TEX}$ in two steps (speed "A" and speed "B") depending upon the amount of slip of the lock-up clutch 32, the slip control terminating speed $N_{TEX}$ may be determined such that the speed $N_{TEX}$ varies as a function of the absolute value $|N_{SLP}|$ of the slip speed of the clutch 32 (amount of slip of the clutch). For example, the slip control terminating speed $N_{TEX}$ may be determined according to a data map stored in the transmission controller 184, which data map represents a predetermined relationship between the speed $N_{TEX}$ and the amount of slip $|N_{SLP}|$ of the lock-up clutch 32.

The slip control of the lock-up clutch 32 during deceleration of the vehicle with the throttle valve 166 placed in the engine idling position is effected for the purpose of raising the engine speed $N_E$ to thereby increase the time duration of the fuel cut of the engine 10 for improving the fuel economy of the vehicle. The engine speed NE is raised by increasing the engagement force of the clutch 32 to thereby increase the engine braking effect, that is, increase the negative torque to be transmitted to the engine 10 through the lock-up clutch 32. If the brake of the vehicle is activated by the vehicle driver in this condition, however, the engine speed $N_E$ is lowered as the rotating speed of the drive wheels is lowered by the brake application. If the fuel cut is continued in this condition, the engine may stall. In this respect, it is desirable to terminate the fuel cut of the engine 10 when the engine speed $N_E$ is lowered to a predetermined fuel-cut terminating speed during the fuel cut.

Figure 22:
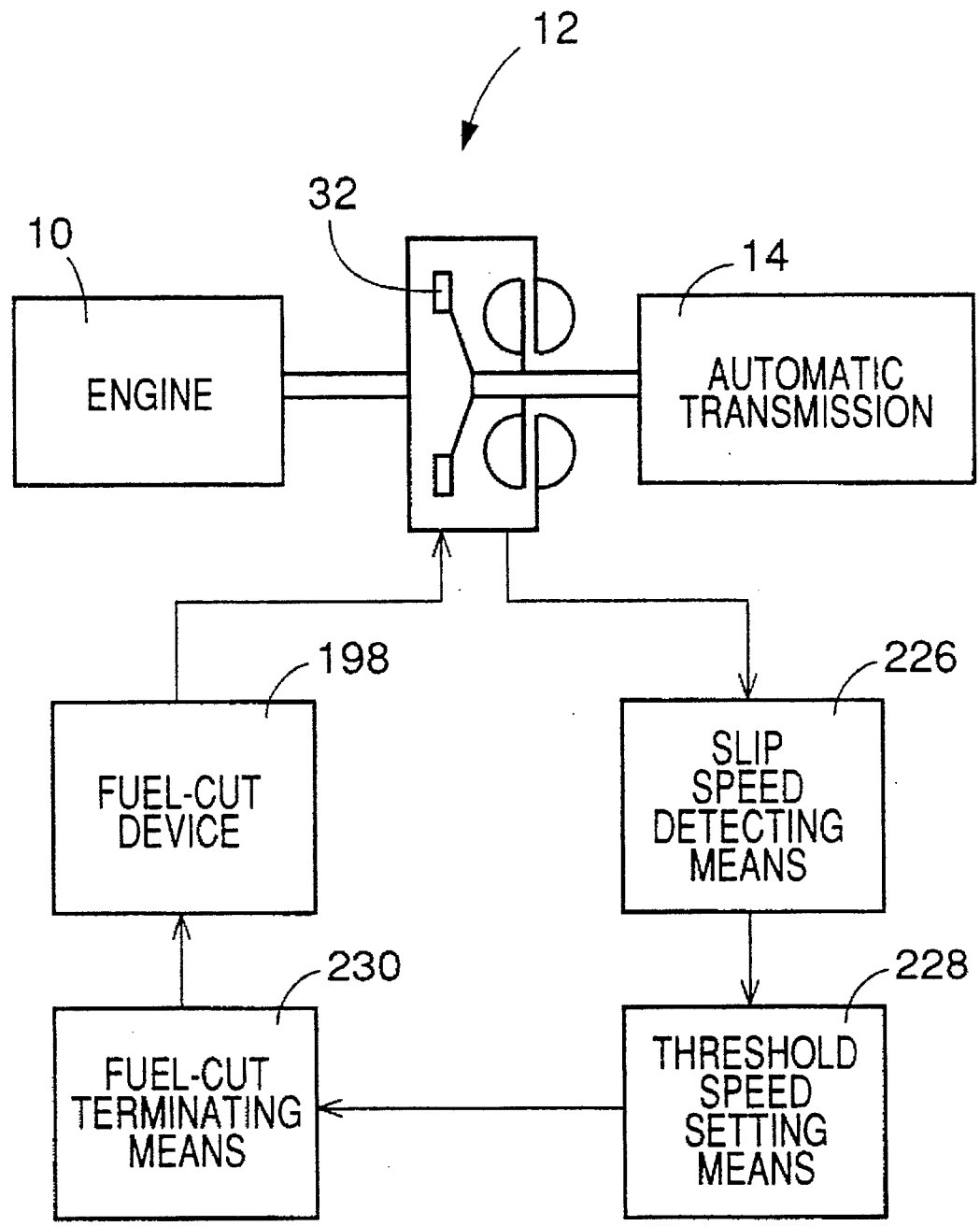
FIG. 22 is a schematic block diagram illustrating functional meads provided in a fuel-cut control apparatus incorporated in an engine controller of the control system of FIG. 3, for controlling a fuel-cut device to cut fuel supply to the engine, in a fourth embodiment of the invention.
Figure 23:
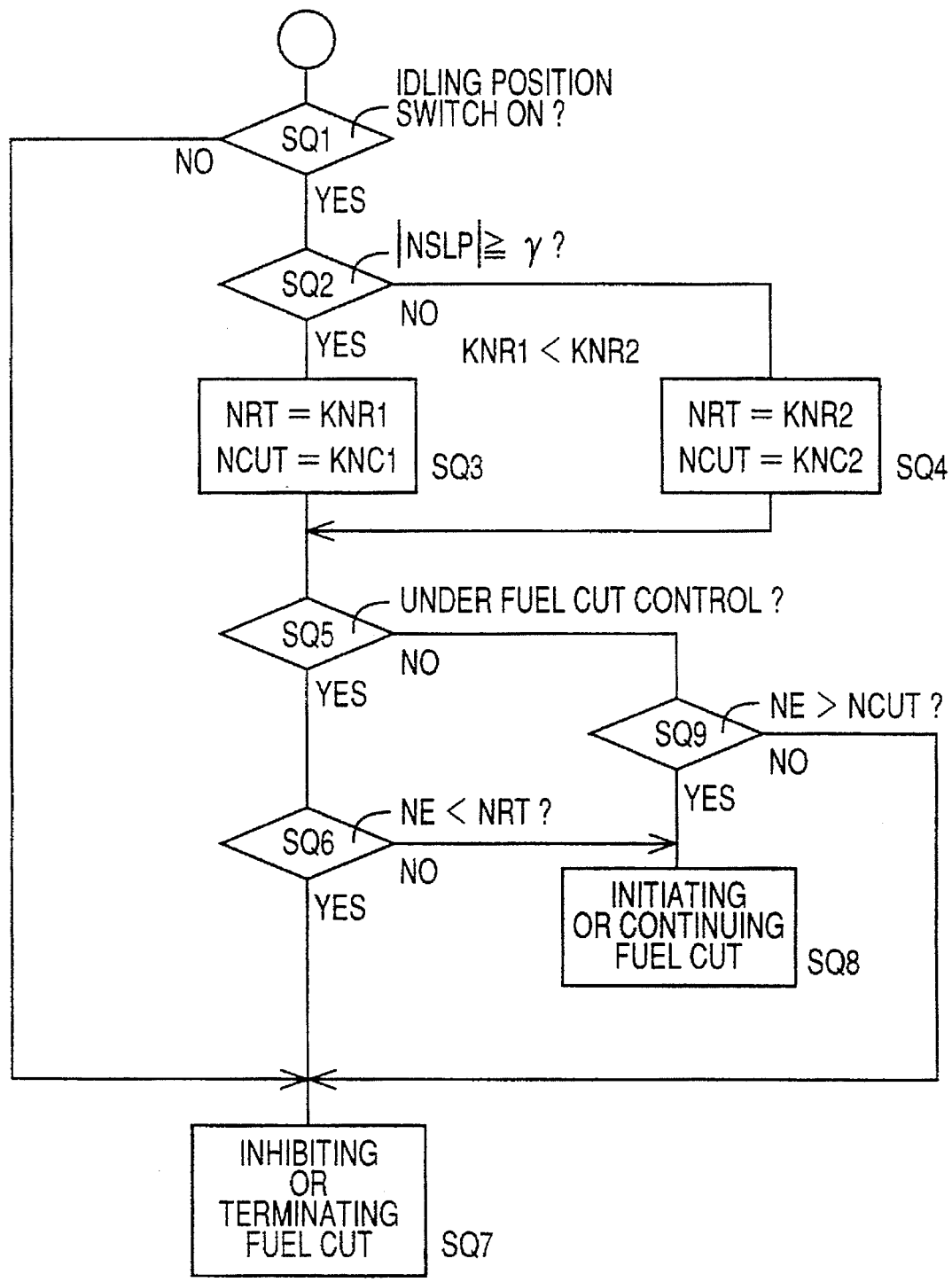
FIG. 23 is a flow chart illustrating a routine for controlling the fuel-cut device in the fourth embodiment.

A fuel-cut control apparatus according to a fourth embodiment of this invention as shown in FIGS. 22 and 23 is constructed in view of the above desirability in relation to the fuel-cut operation by the fuel-cut device 198 as described above with respect to the first embodiment of FIG. 8. The fuel-cut control apparatus includes the fuel-cut device 198, slip speed detecting means 226, threshold speed setting means 228 and fuel-cut terminating means 230, as indicated in the block diagram of FIG. 22. The slip speed detecting means 226 is similar to the slip speed detecting means 220 provided in the third embodiment of FIG. 19.

The threshold speed setting means 228 is adapted to determine a fuel-cut terminating speed $N_{RT}$ depending upon the absolute value of the detected slip speed $N_{SLP}$, that is, depending upon the amount of slip of the lock-up clutch 32. The fuel-cut terminating means 230 is adapted to command the fuel-cut device 198 to terminate the fuel cut of the engine 10 when the engine speed $N_E$ falls below the determined fuel-cut terminating speed $N_{RT}$, as described below in detail by reference to the flow chart of FIG. 23.

The flow chart of FIG. 23 illustrates a routine for controlling the fuel-cut device 198 which is arranged to cut the fuel supply to the engine 10 when the engine speed is higher than a predetermined fuel-cut initiating speed $N_{CUT}$ during deceleration of the vehicle.

The routine of FIG. 23 is initiated with step SQ1 similar to step SN1 of FIG. 20. If a negative decision (NO) is obtained in step SQ1, the control flow goes to step SQ7 to inhibit the fuel cut of the engine 10. If an affirmative decision (YES) is obtained in step SQ1, the control flow goes to step SQ2 to determine whether the absolute value of the detected slip speed $N_{SLP}$ of the clutch 32 is equal to or higher than a predetermined reference value γ. This absolute value indicates the amount of slip of the clutch 32. The reference value γ is relatively close to zero. If an affirmative decision (YES) is obtained in step SQ2, that is, if the slip amount of the clutch 32 is equal to or larger than the reference value γ, step SQ3 is implemented to set the fuel-cut terminating speed $N_{RT}$ to a relatively low first value KNR1, and set the fuel-cut initiating speed $N_{CUT}$ to a first value KNC1. If a negative decision (NO) is obtained in step SQ2, that is, if the slip amount is smaller than the reference value γ, step SQ4 is implemented to set the fuel-cut terminating speed $N_{RT}$ to a relatively high second value KNR1, and set the fuel-cut initiating speed $N_{CUT}$ to a second value KNC2. The first value KNR1 used when the slip amount of the clutch 32 is relatively large is lower than the second value KNR2 used when the slip amount is relatively small.

It will be understood that steps SQ2–SQ4 correspond to the threshold speed setting means 228.

Steps SQ3 and SQ4 are followed by step SQ5 to determine whether the fuel-cut device 198 is in operation to cut the fuel supply to the engine 10. If the fuel-cut device 198 is in operation, the control flow goes to step SQ6 to determine whether the engine speed $N_E$ is lower than the fuel-cut terminating speed $N_{RT}$. If an affirmative decision (YES) is obtained in step SQ6, the control flow goes to step SQ7 to terminate the fuel cut operation of the fuel-cut device 198. That is, the fuel-cut terminating means 230 commands the fuel-cut device 198 to terminate the fuel cut operation.

It will be understood that steps SQ6 and SQ7 correspond to the fuel-cut terminating means 230. If the engine speed $N_E$ is not lower than the fuel-cut terminating speed $N_{RT}$, step SQ8 is implemented to continue the fuel-cut operation.

If a negative decision (NO) is obtained in step SQ5, that is, if the fuel-cut device 198 is not in operation, the control flow goes to step SQ9 to determine whether the engine speed $N_E$ is higher than the fuel-cut initiating speed $N_{CUT}$. If an affirmative decision (YES) is obtained in step SQ9, that is, the engine speed $N_E$ is higher than the fuel-cut initiating speed $N_{CUT}$, step SQ8 is implemented to initiate the fuel-cut operation of the fuel-cut device 198. If a negative decision (NO) is obtained in step SQ9, step SQ7 is implemented to inhibit the fuel-cut operation.

It will be understood that the present fourth embodiment is adapted to determine the fuel-cut terminating speed $N_{RT}$ depending upon the slip amount $|N_{SLP}|$ of the lock-up clutch 32 during the fuel cut of the engine 10 while the vehicle is in a decelerating state. More specifically, the fuel-cut terminating speed $N_{RT}$ is determined to be relatively low (first value "KNR1") when the slip amount of the lock-up clutch 32 is relatively large, and is determined to be relatively high (second value "KNR2") when the slip amount of the clutch 32 is relatively small. The relatively small slip amount of the lock-up clutch 32 means a relatively large transmission torque of the clutch 32 or torque converter 12) due to a relatively large degree of engagement of the clutch 32. For instance, when the slip amount ($|N_{SLP}|$ of the lock-up clutch 32 is substantially zero. As described above with respect to the third embodiment, if the brake of the vehicle is activated during vehicle deceleration with the lock-up clutch 32 being almost fully engaged, the torque transmitted from the vehicle drive wheels is substantially entirely transmitted to the engine 10 through the fully engaged lock-up clutch 32, whereby the engine speed $N_E$ is lowered at a high rate as the vehicle speed is lowered by the brake application. If the lock-up clutch 32 is fully engaged for some reason or other during the slip control of the lock-up clutch 32, the engine speed $N_E$ would be excessively lowered upon brake application and the engine 20 would tend to stall, if the fuel cut of the engine 10 were continued. According to the present fourth embodiment, the fuel cut of the engine 10 is terminated when the engine speed $N_E$ is still relatively high, because the fuel-cut terminating speed $N_{RT}$ is set to be relatively high when the amount of slip of the clutch 32 is relatively small. Thus, the present arrangement is effective to prevent otherwise possible stalling of the engine 10 upon brake application to the vehicle during the fuel cut of the engine while the vehicle is in deceleration. When the amount of slip of the lock-up clutch 32 is relatively large, the brake application to the vehicle will not cause a sudden drop of the engine speed $N_E$. In this case, the fuel cut of the engine 10 is terminated only after the engine speed $N_E$ has been lowered to the relatively low fuel-cut terminating speed $N_{RT}$.

Figure 24:
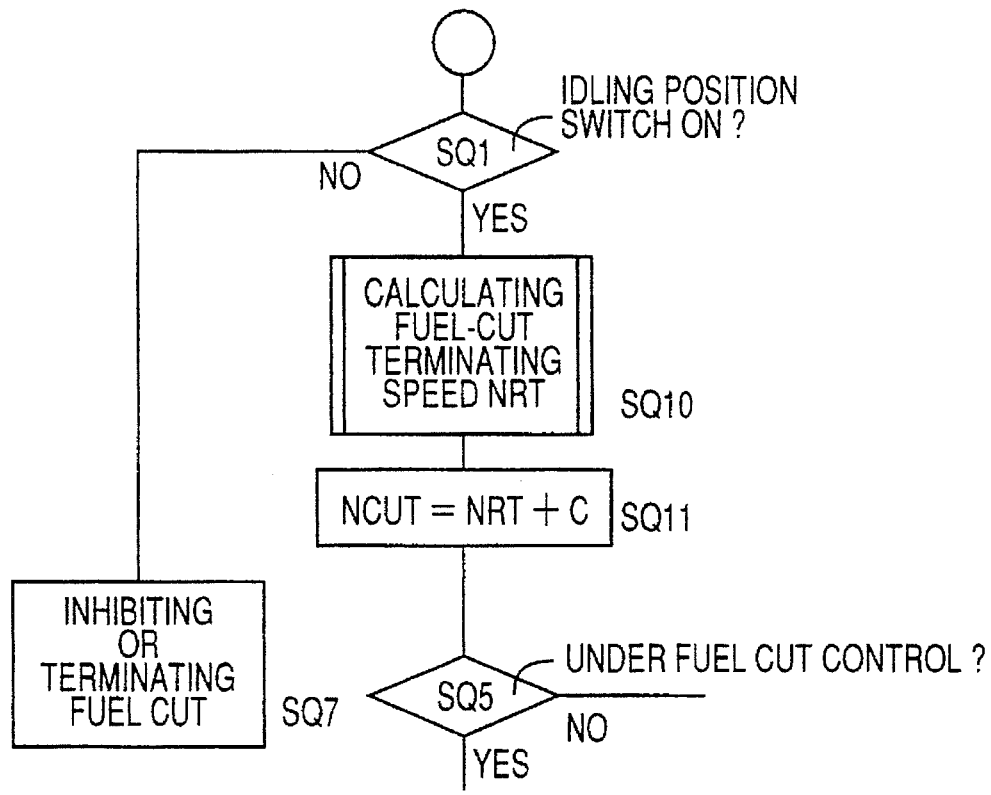
FIG. 24 is a flow chart illustrating a part of a modified routine for controlling the fuel-cut device.
Figure 25:
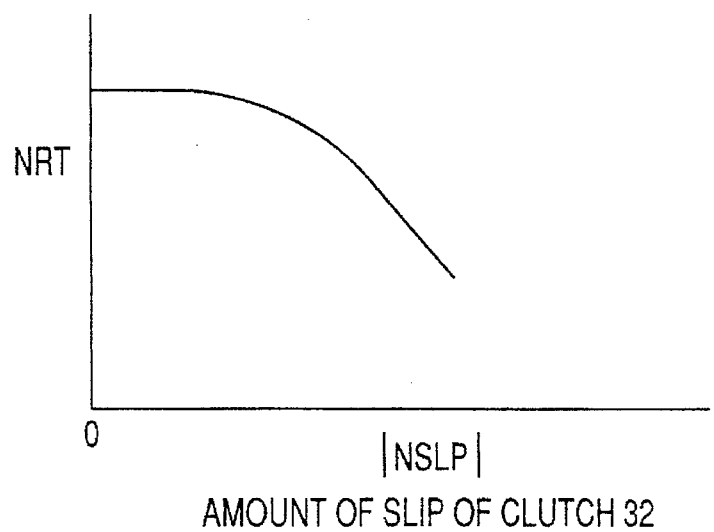
FIG. 25 is a graph indicating a fuel-cut terminating engine speed varying with the slip amount of the lock-up clutch.

Referring to FIGS. 24 and 25, there will be described a modification of the fourth embodiment of FIG. 23. In this modified embodiment, a routine partly illustrated in the flow chart of FIG. 24 is executed to control the fuel-cut device 198. In the routine of FIG. 24, steps SQ10 and SQ11 are substituted for steps SQ2–SQ4 of FIG. 23. Described in detail, step SQ1 is followed by step SQ10 in which the fuel-cut terminating speed $N_{RT}$ is calculated according to a data map stored in the transmission controller 184, and on the basis of the detected slip amount $|N_{SLP}|$. The data map represents a predetermined relationship between the fuel-cut terminating speed $N_{RT}$ and the slip amount of the lock-up clutch 32, as indicated in the graph of FIG. 25, by way of example. According to this relationship, the fuel-cut terminating speed $N_{RT}$ is determined such that the speed $N_{RT}$ increases as the slip amount of the clutch 32 decreases.

It will be understood that step SQ10 corresponds to the threshold speed setting means 228.

Step SQ10 is followed by step SQ11 to set the fuel-cut initiating speed $N_{CUT}$ such that the speed $N_{CUT}$ is larger than the fuel-cut terminating speed $N_{RT}$ by a predetermined amount C.

While the routines of FIGS. 23 and 24 are arranged to be executed while the slip control means 196 is in operation to control the lock-up clutch 32 in the slip control mode, these routines may be executed even when the lock-up clutch 32 is held in the fully engaged state. In this case, step SQ2 in the routine of FIG. 23 is considered to be a step to determine whether the lock-up clutch 32 is in the fully engaged state or not. That is, step SQ4 is implemented when the lock-up clutch 32 is fully engaged.

While the present invention has been described above in detail in its presently preferred embodiments, it is to be understood that the invention is not limited to the details of the illustrated embodiments, but may be embodied with various changes, modifications and improvements, which may occur to those skilled in the art, without departing from the spirit and scope of the invention defined in the following claims.

What is claimed is:

1. An apparatus for controlling an amount of slip of a lock-up clutch disposed between a pump impeller and a turbine impeller in a power transmitting device of a motor vehicle equipped with a fuel-cut device for cutting a fuel supply to an engine while a speed of the engine is higher than a predetermined fuel-cut speed during deceleration of the vehicle, said apparatus including slip control means for producing a slip control output for controlling the amount of slip of said lock-up clutch during the deceleration of the vehicle, the motor vehicle having an engine-driven device which is operated by said engine, said apparatus comprising:

deceleration monitoring means for determining whether the vehicle is in a deceleration state following an accelerating state;

timing control means for commanding said slip control means to initiate a slip control operation to control the amount of slip of said lock-up clutch, upon determination of said deceleration monitoring means that said vehicle is in said decelerating state, said timing control means inhibiting said fuel-cut device from initiating a fuel-cut operation to cut the fuel supply to said engine, for a predetermined delay time after the initiation of said slip control operation of said slip control means, for thereby reducing an amount of change of the speed of the engine in an initial period of said slip control operation; and slip control output changing means for changing said slip control output of said slip control means such that an actual slip speed of said lock-up clutch eventually coincides with a predetermined target slip speed, after said fuel-cut operation of said fuel-cut device is initiated said predetermined delay time after said initiation of said slip control operation of said slip control means.

2. An apparatus according to claim 1, wherein the vehicle has an engine-driven device which is operated by said engine, and said timing control means includes:

time measuring means for measuring a time which has passed after said deceleration monitoring means has determined that the vehicle is in said decelerating state; and delay-time setting means for determining said predetermined delay time such that the delay time is longer when said engine-driven device is in operation than when said engine-driven device is not in operation, and wherein said timing control means commands said fuel-cut device to initiate said fuel-cut operation when the time measured by said time measuring means coincides with the delay time determined by said delay-time setting means.

3. An apparatus according to claim 1, wherein said timing control means includes gradual fuel-cut commanding means for commanding said fuel-cut device to gradually reduce the fuel supply to the engine, to thereby reduce an amount of change of an output torque of the engine due to said fuel-cut operation of said fuel-cut device.

4. An apparatus according to claim 1, wherein said deceleration monitoring means comprises a sensor for detecting that a throttle valve of the engine is placed in an idling position, said deceleration monitoring means determines that the vehicle is in said decelerating state, if said sensor detects that said throttle valve is placed in said idling position.

5. An apparatus according to claim 1, wherein said time measuring means measures said predetermined time after the engine is brought to an idling state.

6. An apparatus according to claim 5, wherein said slip control means initiates said slip control operation to control the amount of slip of said lock-up clutch when said engine is brought to said idling state.

7. An apparatus according to claim 6, wherein said fuel-cut device initiates a fuel-cut operation to cut the fuel supply to said engine when said engine is brought to said idling state.

8. An apparatus according to claim 1, wherein said slip control output of said slip control means includes a feedback control value and a feed-forward control value, said slip control output changing means gradually increasing said feedback control value to a value at which said actual slip speed coincides with said predetermined target slip speed.

9. An apparatus for controlling an amount of slip of a lock-up clutch disposed between a pump impeller and a turbine impeller in a power transmitting device of a motor vehicle equipped with a fuel-cut device for cutting a fuel supply to an engine while a speed of the engine is higher than a predetermined fuel-cut speed during deceleration of the vehicle, said apparatus including slip control means for producing a slip control output for controlling the amount of slip of said lock-up clutch during the deceleration of the vehicle, such that an actual slip speed of said lock-up clutch coincides with a predetermined target slip speed, said slip control output including a feedback control value and a feed-forward control value, said apparatus comprising:

fuel-cut monitoring means for determining whether said fuel-cut device is in operation to cut the fuel supply to said engine; and slip control output changing means for restricting said feedback control value of said slip control output of said slip control means during a slip control operation of said slip control means to control the amount of slip of said lock-up clutch during the deceleration of the vehicle, while said fuel-cut monitoring means determines that said fuel-cut device is not in operation, said slip control output changing means cancelling restriction of said feedback control value when said fuel-cut monitoring means determines that said fuel-cut device is in operation.

10. An apparatus according to claim 9, wherein said slip control output changing means includes gradual changing means for gradually changing said feedback control value back to a value normally used during said fuel-cut operation, after said fuel-cut monitoring means determines that said fuel-cut device is in operation.

11. An apparatus according to claim 9, wherein said slip control output changing means zeroes said feedback control value until said fuel-cut monitoring means determines that said fuel-cut device is in operation.

12. An apparatus according to claim 9, wherein said feedback value of said slip control output used while said fuel-cut device is in operation is calculated according to a predetermined equation which includes at least one parameter associated with a control error of said slip control means, which control error is a difference between said actual slip speed and said target slip speed of said lock-up clutch.

13. An apparatus including slip control means for effecting a slip control operation to control an amount of slip of a lock-up clutch disposed between a pump impeller and a turbine impeller in a fluid-filled power transmitting device of a motor vehicle, during deceleration of the vehicle, the vehicle having a fuel-cut device for cutting a fuel supply to an engine during the deceleration of the vehicle, said apparatus comprising:

time measuring means for measuring a time which has passed after the vehicle is brought to a decelerating state;

brake monitoring means for determining whether a brake is activated to apply a brake to the vehicle; and slip control terminating means for commanding said slip control means to terminate said slip control operation, when a predetermined time has been measured by said time measuring means, if said brake monitoring means determines that said brake is not activated within said predetermined time.

14. An apparatus according to claim 13, further comprising delay means for delaying the initiation of a fuel-cut operation of said fuel-cut device to cut the fuel supply to said engine, by a predetermined delay time with respect to a moment when the vehicle is brought to said decelerating state.

15. An apparatus according to claim 14, wherein said delay time is longer than said predetermined time.

16. An apparatus including slip control means for effecting a slip control operation to control an amount of slip of a lock-up clutch disposed between a pump impeller and a turbine impeller in a fluid-filled power transmitting device of a motor vehicle, during deceleration of the vehicle, the vehicle having a fuel-cut device for cutting a fuel supply to an engine during the deceleration of the vehicle, said apparatus comprising:

time measuring means for measuring a time which has passed after the vehicle is brought to a decelerating state;

brake monitoring means for determining whether a brake is activated to apply a brake to the vehicle;

vehicle speed detecting means for detecting a running speed of the vehicle; and slip control terminating means for commanding said slip control means to terminate said slip control operation, when a predetermined time has been measured by said time measuring means, if said running speed of the vehicle detected by said vehicle speed detecting means is lower than a predetermined threshold upon expiration of said predetermined time and if said brake monitoring means determines that said brake is not activated within said predetermined time.

17. An apparatus according to claim 16, wherein said time measuring means measures said predetermined time after the engine is brought to an idling state.

18. An apparatus according to claim 17, wherein said slip control means initiates said slip control operation to control the amount of slip of said lock-up clutch when said engine is brought to said idling state.

19. An apparatus according to claim 18, wherein said fuel-cut device initiates a fuel-cut operation to cut the fuel supply to said engine when said engine is brought to said idling state.

20. An apparatus according to claim 16, further comprising delay means for delaying the initiation of a fuel-cut operation of said fuel-cut device to cut the fuel supply to said engine, by a predetermined delay time with respect to a moment when the vehicle is brought to said decelerating state.

21. An apparatus including slip control means for effecting a slip control operation to control an amount of slip of a lock-up clutch disposed between a pump impeller and a turbine impeller in a fluid-filled power transmitting device of a motor vehicle, while a speed of said turbine impeller is higher than a threshold speed during deceleration of the vehicle, said apparatus comprising:

slip speed detecting means for detecting a slip speed of said lock-up clutch during said slip control operation of said slip control means, said slip speed being a difference which is equal to a speed of said pump impeller minus the speed of said turbine impeller;

threshold speed setting means for determining said threshold speed of said turbine impeller such that said threshold speed is higher when an absolute value of said actual slip speed detected by said slip speed detecting means is relatively small than when said absolute value is relatively large; and slip control terminating means for commanding said slip control means to terminate said slip control operation, when the speed of said turbine impeller falls below said threshold speed determined by said threshold speed setting means.

22. An apparatus according to claim 21, further comprising slip control initiating means for commanding said slip control means to initiate said slip control operation to control the amount of slip of said lock-up clutch when the vehicle is brought to a decelerating state while the speed of said turbine impeller is higher than a predetermined slip control initiating speed.

23. An apparatus according to claim 22, wherein said threshold speed setting means determines a slip control terminating speed as said threshold speed of said turbine impeller, said slip control terminating means commanding said slip control means to terminate said slip control operation when the speed of said turbine impeller falls below said slip control terminating terminating speed.

24. An apparatus including a fuel-cut device for effecting a fuel-cut operation to cut a fuel supply to an engine of a motor vehicle while a speed of said engine is higher than a threshold speed during deceleration of the vehicle, said vehicle being equipped with a fluid-filled power transmitting device including a pump impeller, a turbine impeller, and a lock-up clutch disposed between said pump and turbine impellers, said apparatus comprising:

slip speed detecting means for detecting a slip speed of said lock-up clutch during said fuel-cut operation of said fuel-cut device, said slip speed being a difference which is equal to a speed of said pump impeller minus a speed of said turbine impeller;

threshold speed setting means for determining said threshold speed such that said threshold speed is higher when an absolute value of said slip speed detected by said slip speed detecting means is relatively small than when said absolute value is relatively large; and fuel-cut terminating means for commanding said fuel-cut device to terminate said fuel-cut operation, when the speed of said engine falls below said threshold speed determined by said threshold speed setting means.

25. An apparatus according to claim 24, further comprising fuel-cut initiating means for commanding said fuel-cut device to initiate said fuel-cut operation when the vehicle is brought to a decelerating state while the speed of said engine is higher than a predetermined fuel-cut initiating speed.

26. An apparatus according to claim 25, wherein said threshold speed setting means determines a fuel-cut terminating speed as said threshold speed, said fuel-cut terminating means commanding said fuel-cut device to terminate said fuel-cut operation when the speed of said engine falls below said fuel-cut terminating speed.

27. An apparatus according to claim 24, wherein said threshold speed setting means determines said threshold speed such that the threshold speed varies as a function of said absolute value of said slip speed.

28. An apparatus for controlling an amount of slip of a lock-up clutch disposed between a pump impeller and a turbine impeller in a power transmitting device of a motor vehicle equipped with a fuel-cut device for cutting a fuel supply to an engine while a speed of the engine is higher than a predetermined fuel-cut speed during deceleration of the vehicle, said apparatus including slip control means for controlling the amount of slip of said lock-up clutch during the deceleration of the vehicle such that an actual slip speed of said lock-up clutch coincides with a predetermined target slip speed, the motor vehicle having an engine-driven device which is operated by said engine, said apparatus comprising:

deceleration monitoring means for determining whether the vehicle is in a deceleration state following an accelerating state; and timing control means for commanding said slip control means to initiate a slip control operation to control the amount of slip of said lock-up clutch, upon determination of said deceleration monitoring means that said vehicle is in said decelerating state, said timing control means inhibiting said fuel-cut device from initiating a fuel-cut operation to cut the fuel supply to said engine, for a predetermined delay time after the initiation of said slip control operation of said slip control means, for thereby reducing an amount of change of the speed of the engine in an initial period of said slip control operation, and wherein said timing control means includes:

time measuring means for measuring a time which has passed after said deceleration monitoring means has determined that the vehicle is in said decelerating state; and delay-time setting means for determining said predetermined delay time such that the delay time is longer when said engine-driven device is in operation than when said engine-driven device is not in operation, and wherein said timing control means commands said fuel-cut device to initiate said fuel-cut operation when the time measured by said time measuring means coincides with the delay time determined by said delay-time setting means.

29. An apparatus according to claim 28, wherein said engine-driven device is an air conditioner.

30. An apparatus for controlling an amount of slip of a lock-up clutch disposed between a pump impeller and a turbine impeller in a power transmitting device of a motor vehicle equipped with a fuel-cut device for cutting a fuel supply to an engine while a speed of the engine is higher than a predetermined fuel-cut speed during deceleration of the vehicle, said apparatus including slip control means for controlling the amount of slip of said lock-up clutch during the deceleration of the vehicle such that an actual slip speed of said lock-up clutch coincides with a predetermined target slip speed, said apparatus comprising:

deceleration monitoring means for determining whether the vehicle is in a deceleration state following an accelerating state; and timing control means for commanding said slip control means to initiate a slip control operation to control the amount of slip of said lock-up clutch, upon determination of said deceleration monitoring means that said vehicle is in said decelerating state, said timing control means inhibiting said fuel-cut device from initiating a fuel-cut operation to cut the fuel supply to said engine, for a predetermined delay time after the initiation of said slip control operation of said slip control means, for thereby reducing an amount of change of the speed of the engine in an initial period of said slip control operation, and wherein said timing control means includes gradual fuel-cut commanding means for commanding said fuel-cut device to gradually reduce the fuel supply to the engine, to thereby reduce an amount of change of an output torque of the engine due to said fuel-cut operation of said fuel-cut device.

31. An apparatus for controlling an amount of slip of a lock-up clutch disposed between a pump impeller and a turbine impeller in a power transmitting device of a motor vehicle equipped with a fuel-cut device for cutting a fuel supply to an engine while a speed of the engine is higher than a predetermined fuel-cut speed during deceleration of the vehicle, said apparatus including slip control means for producing a slip control output for controlling the amount of slip of said lock-up clutch during the deceleration of the vehicle, such that an actual slip speed of said lock-up clutch coincides with a predetermined target slip speed, said slip control output including a feedback control value and a feed-forward control value, said apparatus comprising:

fuel-cut monitoring means for determining whether said fuel-cut device is in operation to cut the fuel supply to said engine; and slip control output changing means for restricting said feedback control value of said slip control output of said slip control means during a slip control operation of said slip control means to control the amount of slip of said lock-up clutch during the deceleration of the vehicle, while said fuel-cut monitoring means determines that said fuel-cut device is not in operation, said slip control output changing means cancelling restriction of said feedback control value when said fuel-cut monitoring means determines that said fuel-cut device is in operation, and wherein said slip control output changing means includes gradual changing means for gradually changing said feedback control value back to a value normally used during said fuel-cut operation, after said fuel-cut monitoring means determines that said fuel-cut device is in operation.

32. An apparatus according to claim 31, wherein said gradual changing means increments said feedback control value from zero back to said value normally used during said fuel-cut operation, while said fuel-cut device is in operation.

* * * * *